US012257632B2

(12) United States Patent
Obrovac et al.

(10) Patent No.: US 12,257,632 B2
(45) Date of Patent: Mar. 25, 2025

(54) METHOD FOR MAKING LOW SURFACE AREA ALLOY PARTICULATE WITH HIGH SILICON CONTENT

(71) Applicant: NOVONIX BATTERY TECHNOLOGY SOLUTIONS INC., Bedford (CA)

(72) Inventors: Mark N. Obrovac, Halifax (CA); Simeng Cao, Halifax (CA); Mina Salehabadi, Halifax (CA)

(73) Assignee: Novonix Battery Technology Solutions Inc., Dartmouth (CA)

( * ) Notice: Subject to any disclaimer, the term of this patent is extended or adjusted under 35 U.S.C. 154(b) by 317 days.

(21) Appl. No.: 17/719,955

(22) Filed: Apr. 13, 2022

(65) Prior Publication Data

US 2022/0331863 A1 Oct. 20, 2022

Related U.S. Application Data

(60) Provisional application No. 63/174,757, filed on Apr. 14, 2021.

(51) Int. Cl.
  *B22F 9/04* (2006.01)
  *B22F 1/054* (2022.01)
  (Continued)

(52) U.S. Cl.
  CPC ............. *B22F 9/04* (2013.01); *B22F 1/054* (2022.01); *B22F 1/08* (2022.01); *H01M 4/1395* (2013.01);
  (Continued)

(58) Field of Classification Search
  CPC ... B22F 9/04; B22F 2009/043; H01M 4/1395; H01M 4/134; C22C 29/18; C01B 33/00; C01B 33/02; C01B 33/06
  See application file for complete search history.

(56) References Cited

U.S. PATENT DOCUMENTS 8,287,772 B2 10/2012 Le et al.
8,753,545 B2 6/2014 Obrovac et al.
(Continued)

FOREIGN PATENT DOCUMENTS

CA 3152799 A1 10/2022
CN 103451461 A * 12/2013
(Continued)

OTHER PUBLICATIONS

Qian, Lingzhi, et al. "Two-step ball-milling synthesis of a Si/SiO x/C composite electrode for lithium ion batteries with excellent long-term cycling stability." RSC advances 7.58 (2017): 36697-36704 (Year: 2017).*

(Continued)

*Primary Examiner* — Sally A Merkling
*Assistant Examiner* — Sean P. O'Keefe
(74) *Attorney, Agent, or Firm* — Knobbe, Martens, Olson & Bear, LLP

(57) ABSTRACT

A simple method for making low surface area alloy particles with high silicon content has been discovered. The method involves two ball milling steps in which silicon containing precursor particles undergo a first milling to render the elemental silicon present to have an average grain size less than 20 nm, followed by a second milling with incorporated binding metal particles (e.g. certain transition metals) that serve to bind the first milled particles together. Done appropriately, the two milling step method results in alloy particles with high silicon content and have relatively low surface area and large particle size. As such, the particles are desirable for use in anode electrodes in rechargeable lithium batteries.

24 Claims, 14 Drawing Sheets

(51) Int. Cl.
  *B22F 1/08* (2022.01)
  *H01M 4/1395* (2010.01)
  *H01M 4/38* (2006.01)
  *H01M 10/052* (2010.01)
  *H01M 10/44* (2006.01)

(52) U.S. Cl.
  CPC ......... *H01M 4/386* (2013.01); *H01M 10/052* (2013.01); *H01M 10/44* (2013.01); *B22F 2009/043* (2013.01); *B22F 2201/10* (2013.01); *B22F 2301/205* (2013.01); *B22F 2302/45* (2013.01); *B22F 2304/054* (2013.01)

(56) References Cited

U.S. PATENT DOCUMENTS

| | | | |
|---|---|---|---|
| 9,029,016 | B2 | 5/2015 | Lee et al. |
| 9,142,832 | B2 | 9/2015 | Suzuki et al. |
| 9,859,553 | B2 | 1/2018 | Morita et al. |
| 10,050,260 | B2 | 8/2018 | Obrovac et al. |
| 2004/0131938 | A1 | 7/2004 | Nishino et al. |
| 2008/0206641 | A1 | 8/2008 | Christensen et al. |
| 2013/0295454 | A1* | 11/2013 | Huang .................. H01M 4/625 252/511 |
| 2015/0228970 | A1 | 8/2015 | Song et al. |
| 2015/0255793 | A1 | 9/2015 | Wakizaka et al. |
| 2017/0098820 | A1 | 4/2017 | Obrovac et al. |
| 2022/0059812 | A1 | 2/2022 | Obrovac et al. |

FOREIGN PATENT DOCUMENTS

| | | | |
|---|---|---|---|
| EP | 1657768 A1 | | 5/2006 |
| EP | 3900082 A2 | | 4/2024 |
| JP | 2006-164952 A | | 6/2006 |
| JP | 2006216277 A | * | 8/2006 |
| JP | 2006-253126 A | | 9/2006 |
| JP | 2022-510833 A | | 1/2022 |
| WO | WO 2013/155397 A1 | | 10/2013 |
| WO | WO 2016/150639 A1 | | 9/2016 |
| WO | WO-2018159870 A1 | * | 9/2018 |
| WO | WO-2019198052 A1 | * | 10/2019 ......... C01B 21/0821 |
| WO | WO 2020/131429 A2 | | 6/2020 |

OTHER PUBLICATIONS

Huang, Xiaoyu, et al. "Microstructure, mechanical properties and strengthening mechanisms of in-situ prepared (Ti5Si3+ TIC0. 67)/ TC4 composites." Journal of Alloys and Compounds 792 (2019): 907-917. (Year: 2019).*

Obrovac et al., "Alloy Design for Lithium-Ion Battery Anodes," Journal of The Electrochemical Society 154: A849-A855 (2007).

Obrovac et al., "Alloy Negative Electrodes for Li-Ion Batteries," American Chemical Society 114: 11444-11502 (2014).

Alonso et al., "Mechanism of the Combined Coating-Mechanofusion Processing of Powders," Powder Technology 59: 45-52 (1989).

Chen et al., "Numerical simulation of Mechanofusion system," Powder Technology 146: 121-136 (2004).

Chen et al., "Green Synthesis and Stable Li-Storage Performance of FeSi2/Si@C Nanocomposite for Lithium-Ion Batteries," ACS Applied Materials & Interfaces 4: 3753-3758 (2012).

Chevrier et al., "Evaluating Si-Based Materials for Li-IoN Batteries in Commercially Relevant Negative Electrodes," Journal of the Electrochemical Society 161: A783-A791 (2014).

Chou et al., "Preparation of Graphite/Nano-Powder Composite Particles and Applicability as Carbon Anode Material in a Lithium Ion Battle," Advanced Power Technology 19: 383-396 (2008).

Cui et al., "Carbon-Silicon Core- Shell Nanowires as High Capacity Electrode for Lithium Ion Batteries," Nano Lett. 9: 3370-3374 (2009).

Dimov et al., "Characterization of carbon-coated silicon Structural evolution and possible limitations," Journal of Power Sources 114:88-95 (2003).

Du et al., "High Energy Density Calendered Si Alloy/Graphite Anodes," Journal of The Electrochemical Society 161: A1698-A1705 (2014).

Lee et al., "Carbon-coated nano-Si dispersed oxides/graphite composite as anode material for lithium ion batteries," Electrochemistry Communications 6: 465-469 (2004).

Li et al., "A High Capacity Nano-Si Composite Anode Material for Lithium Rechargeable Batteries," Electrochemical and Solid-State Letters 2: 547-549 (1999).

Lin et al., "A high tap density secondary silicon particle anode fabricated by scalable mechanical pressing for lithium-ion batteries," Energy & Environmental Science (2015).

Liu et al., "Electrochemical Characterizations on Si and C-Coated Si Particle Electrodes for Lithium-Ion Batteries," Journal of The Electrochemical Society 152: A1719-A1725 (2005).

Liu et al., "Advanced Materials for Energy Storage," Advanced Energy Materials 22: E28-E62 (2010).

Liu et al., "A pomegranate-inspired nanoscale design for large-volume-change lithium battery anodes," Nature Nanotechnology (2014).

Marom et al., "A review of advanced and practical lithium battery materials," Journal of Materials Chemistry 21: 9938-9954 (2011).

Mechano Fusion System AMS Designed for particle-to-particle combination in order to enhance particle performance KONA 17: 244-250 (1999).

Naito et al., "Analysis of the Powder Composite Process by a Mechanical Method," Kona 11: 229-234 (1993).

Naito et al., "Applications of Communition Techniques for the Surface Modification of Powder Materials," ISIJ International 33: 915-924 (1993).

Ng et al., "Highly Reversible Lithium Storage in Spheroidal Carbon-Coated Silicone Nancomposites as Anodes for Lithium-Ion Batteries," Angew. Chem. Int. Ed. 45: 6896-6899 (2006).

Obrovac et al., "Alloy Negative Electrodes for Li-Ion Batteries," Chemical Reviews 114: 11444-11502 (2014).

Park et al., "Si-Encapsulating Hollow Carbon Electrodes via Electroless Etching for Lithium-Ion Batteries," Advanced Energy Materials 3: 206-212 (2013).

Pfeffer et al., "Synthesis of engineered particulates with tailored properties using dry particle coating," Powder Technology 117: 40-67 (2001).

Si et al., "Highly reversible carbon-nano-silicon composite anodes for lithium rechargeable batteries," Journal of Power Sources 189: 761-765 (2009).

Wang et al., "Nanostructured Hybrid Silicon/Carbon Nanotube Heterostructures: Reversible High-Capacity Lithium-Ion Anodes," ACS Nano 4: 2233-2241 (2010).

Wilson et al., "Pyrolysed silicon-containing polymers as high capacity anodes for lithium-ion batteries," Journal of Power Sources 68: 195-200 (1997).

Yokoyama et al., "The Angmill Mechanofusion System and its Applications," Kona 5: 59-68 (1987).

Yokoyama et al., "Ultra-Fine Grinding and Consequent Changes of Powder Characteristics," Kona 1: 53-63 (1983).

Yoshio et al., "Carbon-Coated Si as a Lithium-Ion Battery Anode Material," Journal of The Electrochemical Society 149: A1598-A1603 (2002).

Zuo et al., "Silicon based lithium-ion battery anodes: A chronicle perspective review," Nano Energy 31: 113-143 (2017).

* cited by examiner

METHOD FOR MAKING LOW SURFACE AREA ALLOY PARTICULATE WITH HIGH SILICON CONTENT

CROSS-REFERENCE TO RELATED APPLICATIONS

This application claims priority to U.S. Provisional Patent Application No. 63/174,757, filed Apr. 14, 2021, which is incorporated herein by reference in its entirety.

TECHNICAL FIELD

The present invention pertains to methods for producing silicon alloy particulate with desirable properties (e.g. high silicon content, low surface area, large particle size) for use as anode electrode material in lithium batteries and other applications.

BACKGROUND

The development of rechargeable high energy density batteries, such as Li-ion batteries, is of great technological importance. Typically, commercial rechargeable Li-ion batteries use a lithium transition metal oxide cathode and a graphite anode. While batteries based on such materials are approaching their theoretical energy density limit, significant research and development continues in order to improve other important characteristics such as cycle life, efficiency, and cost. Further, significant research and development continues in order to simplify the methods of production and to reduce the complexity, material amounts, and losses involved.

In order to enhance the performance of such batteries, the use of silicon-based negative electrode materials has been widely studied because of silicon's high theoretical capacity (3579 mAh/g or 2194 Ah/L; see M. N. Obrovac and V. L. Chevrier, Chem. Rev., 2014, 114, 11444-11502). However, the use of pure silicon is hampered by its large volume expansion (280%) during lithiation (e.g. M. N. Obrovac, L. Christensen, D. B. Le and J. R. Dahn, J. Electrochem. Soc., 2007, 154, A849). The stresses produced by volume changes during charge/discharge cycling lead to structural modifications, particle fracture and damage to the solid-electrolyte interphase (see M. N. Obrovac and V. L. Chevrier, Alloy Negative Electrodes for Li-Ion Batteries, Chem. Rev., 114 (2014), 11444. DOI: 10.1021/cr500207g), resulting in cell capacity fade and hence low cycle life.

The cycle life of batteries employing Si-based anodes can be improved by reducing volume expansion and avoiding the formation of $Li_{15}Si_4$ phase during cycling by, for example, alloying Si with a transition metal to form Si/metal silicide active/inactive alloys. Such alloys need a high silicon content (typically greater than 50 atomic percent), so that they can store appreciable amounts of lithium. A low-cost method of making such Si-alloys is by ball milling. However, since high Si content alloys are typically brittle, ball milling results in the formation of submicron particles with high surface area. This particle morphology is not desirable for active materials in lithium batteries. The resulting high surface area requires excessive binder to be used in the formulation of appropriate electrodes to enable good cycling performance. In addition, since electrolyte decomposition reactions occur on alloy surfaces, conventionally prepared high surface area Si alloys have a large contact area with electrolyte in the batteries, leading to increased reactivity with electrolyte and to increased levels of electrolyte decomposition, capacity loss, and shorter cell lifetime.

Despite the substantial effort directed to date at developing such materials and methods of manufacture thereof, there remains a need for further improvement. In particular, there remains a need for creating lower surface area and larger particle size Si alloys suitable for use in such batteries, while still keeping costs down (e.g. by using inexpensive ball milling methods). The present invention addresses these needs and provides further benefits as disclosed below.

SUMMARY

It has been discovered that silicon alloy particles with desirable characteristics can be made using a simple two-step ball milling method. For instance, silicon alloy particles for use in rechargeable lithium batteries desirably have high silicon content that is present in a non-crystalline or amorphous state, and yet the particles also have relatively low surface area and relatively large particle size. In conventional milling processes, milling either is insufficient to render the silicon amorphous or is excessive such that the resulting particulate has undesirably high surface area and low particle size. In the present invention, precursor particles comprising silicon are milled in a first milling step until a first milled particulate is formed comprising an elemental silicon phase that has an average grain size less than 20 nm or is amorphous. Then, transition metal or rare earth metal particles or mixtures thereof are incorporated and the mixture is milled in a second milling step enough to produce the desired particulate, but without excessive milling.

Specifically, the method of the invention is for making low surface area silicon alloy particles comprising an elemental Si phase in an amount that is at least 10% by volume and at least one suitable binding metal, and has an oxygen content in atomic percent that is less than the silicon content. A suitable binding metal is one selected from the group consisting of the transition metals Ti, V, Cr, Mn, Fe, Co, Ni, Cu, W, and Mo and the rare earths Nb, Y, Zr, La, Ce and mischmetal. The method comprises the steps of: obtaining an amount of precursor particles comprising silicon, appropriately ball milling the precursor particles in a first milling step, adding an appropriate amount of binding metal particles to the amount of first milled particles to form a mixture, and then appropriately ball milling the mixture in a second milling step. The first milling step is performed until all the particles essentially have the same composition and microstructure and essentially all the elemental silicon present has an average grain size less than 20 nm. The amount of first milled particles thus produced has a first volumetric surface area. An amount of binding metal particles is then added to the first milled particles. The amount of binding metal particles employed in the mixture with the first milled particles is at least 10 atomic %. The second milling step is performed until all of the following conditions are satisfied. All the second milled particles have essentially the same composition and microstructure. The amount of first milled particles and the amount of binding metal particles should have alloyed sufficiently such that the x-ray diffraction pattern of the second milled mixture has no peaks associated with the binding metal particles or has a largest peak associated with the binding metal particles with an integrated intensity that is less than 10% of the total integrated intensity of the x-ray diffraction pattern measured between 10°-80° 2θ with Cu Kα radiation. Further, all the phases in the second milled mixture should have an average grain size less than 50 nm. Yet further, the surface area of the second milled mixture should have a second volumetric surface area that is at least 20% smaller than the first volumetric surface area. Yet further, the second milled mixture particles are at least 10% by volume an elemental Si phase.

During the second milling step, the nanocrystalline or amorphous nature of the elemental Si phase present may either be maintained or the elemental Si phase present may even become smaller in grain size and/or be completely amorphized. Exemplary milling methods for the first and second milling steps include high energy ball milling or rotary ball milling.

The precursor particles employed in the method can be pure silicon particles, a mixture comprising silicon particles and carbon particles, a mixture comprising silicon particles and precursor transition metal particles, or a mixture comprising silicon particles and precursor rare earth metal particles. For instance, as demonstrated in the following examples, the precursor particles can be a mixture of silicon and titanium particles or pure silicon particles. The precursor particles can be in the form of a Si-alloy. For instance, precursor particles can be an alloy of Si that includes a transition metal made by melting Si and the transition metal together, cooling the melt to produce a solid alloy, and then grinding the solid alloy to form precursor particles. The precursor particles can also include transition or rare earth metal silicides (here referred to collectively as metal silicides). For instance, the precursor particles may be a mixture that includes Si particles and metal silicide particles.

The first milling step can be performed in a non-inert gas, e.g. a gas or gas mixture containing $O_2$ (g), $CO_2$ (g) or $N_2$ (g), or alternatively in an inert gas, such as Ar (g) or He (g). In an exemplary embodiment in which the precursor particles are pure silicon, the first milling step can be performed in air and the first milled particles produced can be amorphous silicon oxide with formula $SiO_x$ wherein $x<1$.

The binding metal particles used in the second milling step comprise certain transition metals and/or rare earth metals. Especially useful as binding metal particles are those transition metals and rare earth metals that form silicides and their mixtures. Exemplary binding metal particles can comprise Ti, V, Cr, Mn, Fe, Co, Ni, Cu, W, Mo, Nb, Y, Zr, La, or Ce. Further, more than one type of transition metal or rare earth metal can be employed. Further still, a portion of the amount of transition metal or rare earth metal particles may be employed in the first milling step. In an exemplary embodiment, the binding metal particles are titanium.

As mentioned, the amount of binding metal particles employed in the mixture with the first milled particles is at least 10 atomic %, but is preferably at least 15 atomic %, and more preferably at least 20 atomic %. However, in some embodiments, during the second milling step, the binding metal particles can react with the elemental silicon phase to produce silicide phases, thus reducing the amount of elemental silicon phase in the alloy. Therefore, excessive amounts of binding metal particles should be avoided, so that the second milled mixture is at least 10% by volume an elemental Si phase.

An indication that the first milling step has been performed sufficiently is when the x-ray diffraction pattern of the first milled particles has essentially no peaks associated with crystalline elemental silicon that correspond to a Scherrer grain size greater than 20 nm. In exemplary embodiments the elemental Si phase in the first milled particles is amorphous. In an embodiment where the precursor particles include a mixture of silicon and precursor transition metal particles, an indication that the first milling step has been performed sufficiently is also when the x-ray diffraction pattern of the first milled particles has essentially no peaks associated with the precursor transition metal particles.

An indication that the second milling step has been performed sufficiently is when the x-ray diffraction pattern of the second milled mixture has a largest peak associated with the binding metal particles with an integrated intensity that is less than 10% of the total integrated intensity of the x-ray diffraction pattern measured between 10°-80° 2θ with Cu Kα radiation. Further, the x-ray diffraction pattern of the second milled mixture should have essentially no peaks associated with any of the phases present that correspond to a Scherrer grain size greater than 50 nm. In some exemplary embodiments, the low surface area silicon alloy particles produced using the method of the invention can consist essentially of phases having an average grain size less than 20 nm. In further exemplary embodiments, the low surface area silicon alloy particles produced using the method of the invention can consist essentially of phases that are amorphous, e.g. including having essentially no peaks associated with the binding metal particles or the elemental Si phase.

Yet further, the surface area of the second milled mixture should have a second volumetric surface area that is at least 20% smaller than the first volumetric surface area. In exemplary embodiments the second volumetric surface area is at least 30% smaller. Further, the second volumetric surface area of the produced low surface area silicon alloy particles can be less than 35 $m^2/cm^3$, less than 25 $m^2/cm^3$, or even smaller. And, the average particle size of the produced low surface area silicon alloy particles can be greater than 0.5 μm. Along with silicon and the transition metal employed the produced low surface area silicon alloy particles may also comprise certain other elements. For instance, in exemplary embodiments, the low surface area silicon alloy particles can comprise silicon, titanium, nitrogen, or oxygen.

The silicon alloy particles made according to the inventive method may be considered for use in numerous commercial applications including as a rechargeable battery electrode component. It can be particularly suitable for use in anode electrodes in rechargeable lithium batteries, e.g. lithium ion batteries.

DETAILED DESCRIPTION

Figure 1:
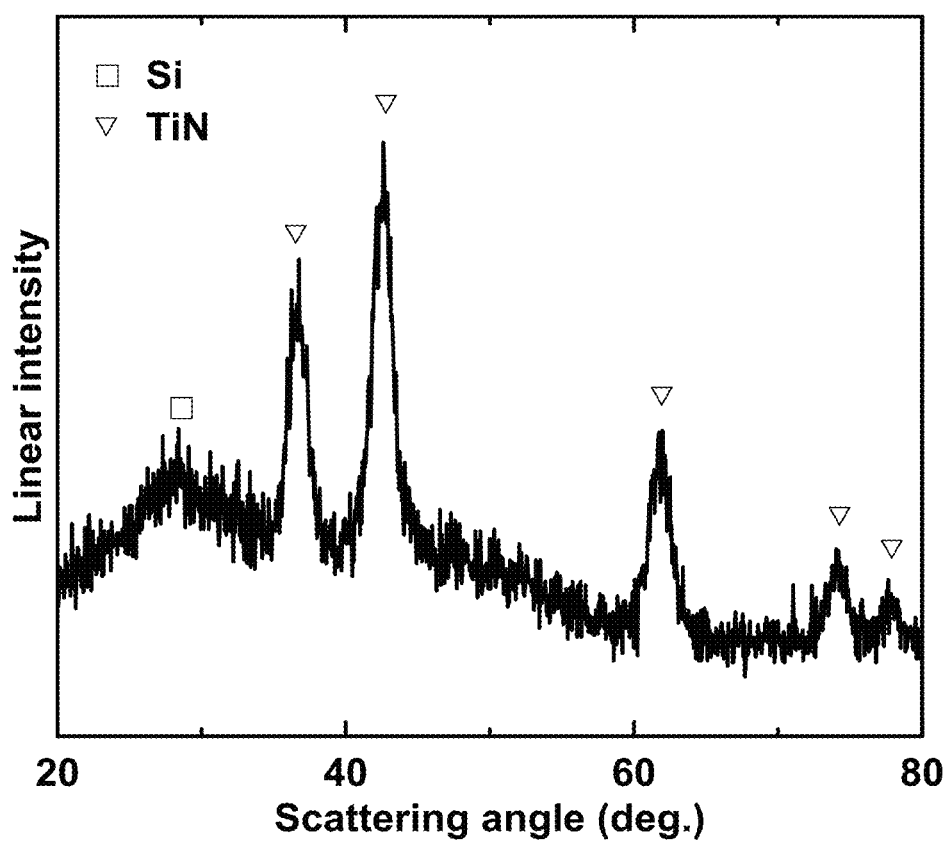
FIG. 1 shows the XRD pattern of the first milled particles of comparative example CE1 and inventive examples IE2 through IE7.

Unless the context requires otherwise, throughout this specification and claims, the words "comprise", "comprising" and the like are to be construed in an open, inclusive sense. The words "a", "an", and the like are to be considered as meaning at least one and are not limited to just one.

The phrases "consisting essentially of", "consists essentially of", "has essentially", and the like are to be interpreted as limiting to the specified materials or steps involved (depending on context) but also to include—and not to exclude—any materials or steps that do not materially affect the basic and novel characteristics of the materials or steps involved.

In a quantitative context, the term "about" should be construed as being in the range up to plus 2% and down to minus 2%.

In addition, the following definitions are to be applied throughout the specification:

"Particulate" refers to a plurality of "particles" in which the "particles" are composed of one or more "grains" (also known in the art as crystallites).

The term "alloy" as used herein refers to a solid substance in which at least 10% by volume of the substance includes phases that consist only of one or more chemical elements that are metals, metalloids, semimetals or semiconductors and in which the substance is homogeneous at a scale of 10 μm.

A material is considered to be "amorphous" herein if its x-ray diffraction pattern has essentially no distinct peaks associated with the crystalline form of that material.

An "inert gas" herein is a noble gas or mixture thereof, while a "non-inert gas" is a gas or gas mixture containing at least one gas other than an inert gas.

The term "average particle size" refers to the average of the greatest dimension of at least 200 random particles as directly observed by SEM.

The term "average grain size" refers to the average grain size of a phase as determined by the Scherrer grain size determination method.

The term "phase" has its conventional general meaning, namely being a distinct and homogeneous form of matter separated at its surface from other forms of matter.

The term "ball milling" refers to a dry milling process that principally uses repeated impacts upon a sample to result in a grain size reduction and/or a chemical change in the sample. Suitable dry impact milling methods include ball milling, SPEX milling, pebble milling, rod milling, high energy ball milling, attritor milling, Sweco milling, vibratory milling, planetary milling and low energy ball milling as described in U.S. Pat. No. 8,287,772 (Le et al).

In a rechargeable battery, the term "cathode" refers to the electrode at which reduction occurs when a metal-ion is discharged. In a lithium ion cell, the cathode is the electrode that is lithiated during discharge and delithiated during charge.

In a rechargeable battery, the term "anode" refers to the electrode at which oxidation occurs when a metal-ion cell is discharged. In a lithium ion cell, the anode is the electrode that is delithiated during discharge and lithiated during charge.

The term "half-cell" refers to a cell that has a working electrode and a metal counter/reference electrode. A lithium half-cell has a working electrode and a lithium metal counter/reference electrode.

The term "density" refers to the density of the solid volume of a substance. That is, the density of a particulate or powder is the density of the particles that make up the particulate or powder not including porosity or voids.

Unless otherwise specified, the term "volume" or "volumetric" when applied to a powder or particulate refers to the solid volume of the particles that make up the particulate or powder not including porosity or voids.

Herein, "first volumetric surface area" of the first milled particles is denoted as FVSA. "Second volumetric surface area" of the second milled mixture is denoted as SVSA. The percent reduction in the SVSA from the FVSA is called percent surface area reduction and is denoted as PSAR. Thus PSAR=(FVSA−SVSA)/FVSA×100% and herein is ≥20%.

The present invention provides a relatively simple, inexpensive method for making low surface area, large particle size alloy particles with high silicon content. These characteristics are particularly desirable for use in anode electrodes in rechargeable lithium batteries. In the method, two ball milling steps are employed. In a first milling step, silicon containing precursor particles are milled to render the silicon amorphous. In the second milling step, transition metal particles are incorporated which serve to bind the first milled particles together. This two milling step method results in alloy particles with high silicon content that are amorphous and also have relatively low surface area and large particle size.

More specifically, the method is for producing low surface area silicon alloy particles which comprise an alloy that is at least 10% by volume of an elemental Si phase, and at least one suitable binding metal, and has an oxygen content in atomic percent that is less than the silicon content. Exemplary compositions of low surface area silicon alloy particles include Si—N-M alloys, Si—O-M alloys, Si—N—O-M alloys, Si—C-M alloys, and Si-M alloys where M is a transition metal or a rare earth metal. Further exemplary compositions of low surface area silicon alloy particles are those in which M is a transition metal or a rare earth metal that forms a silicide, such as Ti, V, Cr, Mn, Fe, Co, Ni, Cu, W, Mo, Nb, Y, Zr, La, or Ce. In some embodiments, compositions of the low surface area silicon alloy particles include $Si_{a''}M'_{b''}O_{c''}C_{d''}N_{e''}$, where M' is one or more transition metals or rare earth metals, $a''+b''+c''+d''+e''=100$, $a''>30$, $b''$ to $e''$ are all greater than or equal to zero, $a''>2b''+c''+d''$, and $e''<a''$. Exemplary compositions of the low surface area silicon alloy particles include $Si_{a''}M'_{b''}$ where $a''>60$; $Si_{a''}M'_{b''}$ where $a''>60$ and M'=Ti or Fe; $Si_{a''}Ti_{b''}N_{e''}$ where $a''>20$ and $b''=e''$; $Si_{a''}M'_{b''}O_{c''}$ where $a''>60$, $b''>0$, and $0<c''\leq(a''/2-b'')$; and $Si_{a''}M'_{b''}O_{c''}$ where $a''>60$, $b''>0$, $0<c''\leq(a''/2-b'')$ and M=Ti or Fe.

During the second milling step, such transition metals or rare earth metals tend to react with elemental silicon to form a nanocrystalline or amorphous metal silicide phase, resulting in low surface area silicon alloy particles with a homogeneous phase distribution on the nano-scale. It is believed that such alloys lithiate and delithiate more homogeneously than alloys comprising phases with large grain sizes; leading to improved capacity retention when the low surface area silicon alloy particles are utilized in a battery.

Without being bound by theory, it is further believed that the utilization of transition metals or rare earth metals in the second milling step acts to bind the particles formed by the first ball milling step together, due to the ductility of the transition and rare earth metals. Therefore, it may be desirable that transition metals or rare earth metals with high ductility be used as the binding metal. In exemplary embodiments, during the second ball milling step the binding metals react with the elemental Si phase to form brittle metal silicides. For this reason, during the second ball milling step, the volumetric surface area may initially decrease as the binding metals bind the particles formed by the first ball milling step together, the volumetric surface area may then reach a minimum value as the binding metals react to form brittle metal silicides, with excessive milling the volumetric surface area may then increase. In exemplary embodiments, the binding metals may have completely converted to metal silicides when the minimum value of the volumetric surface area is achieved in the second ball milling step. In some embodiments, this is an indication that the second ball milling step is complete. In other embodiments, it may be desirable to continue the second ball milling step after the minimum in volumetric surface area is achieved, in order to further refine grain structure. However, in such cases the second ball milling step is completed before the volumetric surface area increases beyond 80% of the volumetric surface area of the product of the first milling step. Phases that may be present in low surface area silicon alloy particles include $SiO_2$, $TiN$, $Si_3N_4$, $FeSi_2$, $FeSi$, $TiSi_2$, $CrSi_2$, $Mn_{11}Si_{19}$, $VSi_2$, $CoSi_2$, $NiSi_2$, $Cu_3Si$, $WSi_2$, $MoSi_2$, $NbSi_2$, $YSi_2$, $ZrSi_2$, $CeSi_2$, or $LaSi_2$.

For the first milling step, a desired amount of precursor particles comprising silicon is obtained. In various embodiments of the invention (and as demonstrated in the Examples below) the precursor particles can be pure silicon particles but can also comprise a mixture of silicon and precursor transition metal particles or alternatively a mixture of silicon and carbon particles. In embodiments in which the precursor particles comprise a mixture of silicon and precursor transition metal particles, the type of transition metal employed may be the same type employed in the subsequent milling step. However, in certain circumstances, other types of transition metals or mixtures of transition metals may be used instead. The amount of transition metal employed in the first milling step is typically a fraction of the total desired in the final product alloy particulate and for instance typically less than that employed in the second milling step.

In some embodiments, compositions of the precursor particulate include $Si_aM_bO_cC_dN_e$, where M is one or more transition metals or rare earth metals that forms a silicide, $a+b+c+d+e=100$, $a>30$, b to e are all greater than or equal to zero, $a>2b+c+d$, and $e<a$. Exemplary compositions of the precursor particulate include Si; $Si_aM_b$ where $a>80$; $Si_aM_b$ where $a>80$ and M=Ti or Fe; and $Si_aTi_bN_e$ where $a>20$ and $b=e$.

In some embodiments, compositions of the first milled alloy particles include $Si_{a'}M_{b'}O_{c'}C_{d'}N_{e'}$, where M is one or more transition metals or rare earth metals that forms a silicide, $a'+b'+c'+d'+e'=100$, $a'>30$, b' to e' are all greater than or equal to zero, $a'>2b'+c'+d'$, and $e'<a'$. Exemplary compositions of the first milled alloy particles include Si; $Si_{a'}O_{c'}$ where $0<c'\le50$; $Si_{a'}M_{b'}$ where $a'>80$; $Si_{a'}M_{b'}$ where $a'>80$ and M=Ti or Fe; $Si_{a'}Ti_{b'}N_{e'}$ where $a'>20$ and $b'=e'$, $Si_{a'}M_{b'}O_{c'}$ where $a'>80$, $b'>0$, and $0<c'\le(a'/2-b')$; and $Si_{a'}M_{b'}O_{c'}$ where $a'>80$, $b'>0$, $0<c'\le(a'/2-b')$ and M=Ti or Fe.

It is expected that preferable amounts can readily be determined by those in the art based on the present disclosure. For instance, guidance is provided in the Examples below in which exemplary embodiments are disclosed with precursor particles comprising a mixture of silicon and titanium particles.

The precursor particles are then milled in this first milling step until all the particles essentially have the same composition and microstructure and essentially all the elemental silicon phase present has a grain size less than 20 nm or is amorphous to produce first milled particles having a first volumetric surface area.

Next, a suitable amount of binding metal particles are added to the amount of first milled particles to form a mixture in which the amount of binding metal particles in the mixture is at least 10 atomic %, but can be at least 15 atomic %, or even higher and at least 20 atomic %. However, in some embodiments, during the second milling step, the binding metal particles can react with the elemental silicon phase to produce silicide phases, thus reducing the amount of elemental silicon phase in the alloy. Therefore, excessive amounts of binding metal particles should be avoided, so that the second milled mixture is at least 10% by volume an elemental Si phase. Suitable binding metal particles include Ti, V, Cr, Mn, Fe, Co, Ni, Cu, W, Mo, Nb, Y, Zr, La, or Ce. The exemplary embodiments in the Examples below for instance employ titanium.

This mixture is then ball milled in a second milling step until: all the particles essentially have the same composition and microstructure, the x-ray diffraction pattern of the second milled mixture has a largest peak associated with the binding metal particles with an integrated intensity that is less than 10% of the total integrated intensity of the x-ray diffraction pattern measured between 10°-80° 2θ with Cu Kα radiation, all the phases in the second milled mixture have an average grain size less than 50 nm, and the surface area of the mixture has a second volumetric surface area that is at least 20% smaller than the first volumetric surface area, i.e. PSAR is at least 20%. These two simple milling steps result in an amount of the desired low surface area silicon alloy particles. It is important however not to excessively mill the mixture in the second milling step. Once the desired particulate has been created, excessive continued milling may slowly break up the particles formed and result in particulate of undesirably large volumetric surface area.

The two milling steps may be carried out in a variety of gaseous environments. In particular, the first milling step can performed in a non-inert gas or gas mixture, e.g. nitrogen, oxygen or air. Alternatively however, the first milling step can be performed in an inert or noble gas, e.g. argon. In some embodiments, the first milling step can be performed in air, for instance, where the precursor particles employed are pure silicon particles such that the first milled particles produced are amorphous silicon oxide with formula $SiO_x$ wherein $x<1$.

Various ball milling techniques can also be used for the first and second milling steps. For instance, high energy ball milling or rotary ball milling may be used. Generally any dry milling process that principally uses repeated impacts upon a sample to result in a grain size reduction and/or a chemical change in the sample may be suitable (e.g. also SPEX milling, pebble milling, rod milling, attritor milling, Sweco milling, vibratory milling, planetary milling, low energy ball milling and the like).

X-ray diffraction methods can be used to confirm that the first milling step has been sufficient to render the silicon nanocrystalline or amorphous. For instance, the first milling is sufficient when the x-ray diffraction pattern of the first milled particles has essentially no peaks associated with crystalline elemental silicon that correspond to a Scherrer grain size greater than 20 nm. In other embodiments the first milling is sufficient when the x-ray diffraction pattern has essentially no peaks associated with crystalline elemental silicon.

That is, the elemental Si phase is amorphous. Further, in embodiments when the precursor particles comprise a mixture of silicon and precursor transition metal particles, the first milling can be sufficient when the x-ray diffraction pattern of the first milled particles also has essentially no peaks associated with the precursor transition metal particles.

X-ray diffraction and particle surface area measurements can be used to confirm that the second milling step has been performed sufficiently. For instance, an indication that the second milling is sufficient is when the x-ray diffraction pattern of the second milled mixture has a largest peak associated with the binding metal particles with an integrated intensity that is less than 10% of the total integrated intensity of the x-ray diffraction pattern measured between 10°-80° 2θ with Cu Kα radiation and that the x-ray diffraction pattern of the second milled mixture has essentially no peaks associated with any of the phases present that correspond to a Scherrer grain size greater than 50 nm. In some exemplary embodiments, an indication that the second milling is sufficient is when the x-ray diffraction pattern of the second milled mixture has a largest peak associated with the binding metal particles with an integrated intensity that is less than 10% of the total integrated intensity of the x-ray diffraction pattern measured between 10°-80° 2θ with Cu Kα radiation and that the x-ray diffraction pattern of the second milled mixture has essentially no peaks associated with any of the phases present that correspond to a Scherrer grain size greater than 20 nm. In some embodiments an indication that the second milling step has been performed sufficiently is additionally when the x-ray diffraction pattern of the second milled mixture particles has essentially no peaks associated with the binding metal particles. In further exemplary embodiments, an indication that the second milling is sufficient is when the x-ray diffraction pattern of the second milled mixture comprises no crystalline peaks, that is the second milled mixture is amorphous.

Particle surface area measurements can additionally be used to confirm that the second milling step has been sufficiently performed. For instance, an indication that second first milling is sufficient when the PSAR is at least 20%. In exemplary embodiments, an indication that the second milling step may have been performed sufficiently is additionally when the second volumetric surface area of the produced low surface area silicon alloy particles is less than 35 m$^2$/cm$^3$. In further exemplary embodiments, an indication that the second milling step may have been performed sufficiently is additionally when the second volumetric surface area of the produced low surface area silicon alloy particles is less than 25 m$^2$/cm$^3$.

The second volumetric surface area of silicon alloy particles produced by the aforementioned methods can be less than 35 m$^2$/cm$^3$, and their average particle size can be greater than 0.5 μm. Further, the particles can consist essentially of phases having an average grain size less than 50 nm. Chemically, certain embodiments of the produced low surface area silicon alloy particles can comprise silicon, titanium, nitrogen, or oxygen.

The volume percent of the elemental Si phase in the low surface area silicon alloy particles can be determined according to the method described in M. N. Obrovac et al., J. Electrochem. Soc., 154 (2007) A849, as follows:

$$A = \frac{\rho c}{(8338 \text{ Ah/L})} \times 100\%$$

Where A is the volume percent of the elemental Si phase in the low surface area silicon alloy particles, ρ is the alloy bulk density in units of g/ml as measured with a helium pycnometer and c is the alloy reversible capacity as measured in a coin lithium half-cell in units of mAh/g. The larger the volume percent of the elemental Si phase in the low surface area silicon alloy particles, the larger its volumetric capacity will be when utilized as a negative electrode material in a Li-ion cell. In exemplary embodiments, the volume percent of the elemental Si phase in the low surface area silicon alloy particles is greater than 10%, greater than 20%, greater than 30%, greater than 40% or even greater.

The reversible volumetric capacity of the low surface area silicon alloy particles may be determined according to the method described in M. N. Obrovac et al., J. Electrochem. Soc., 154 (2007) A849, as follows:

$$R = \frac{1}{\frac{k}{F} + \frac{1}{\rho c}}$$

Where R is the reversible volumetric capacity in units of Ah/L, k=9.00 ml/mol is the molar volume of Li in lithiated Si and F=26802 mAh/mol is the Faraday constant. In exemplary embodiments, the reversible volumetric capacity of the low surface area silicon alloy particles may be greater than 900 Ah/L, greater than 1000 Ah/L, greater than 1500 Ah/L, greater than 1700 Ah/L or even greater.

As those skilled in the art will appreciate, appropriate operating parameters for the two milling steps and appropriate choices for the materials employed can be expected to vary somewhat according to the product desired, the milling technique and apparatus employed, and the like. It is expected that those of ordinary skill will readily be able to determine appropriate operating parameters for a given situation based on the present general disclosure and guidance provided in the Examples below.

Once prepared as in the preceding manner, the silicon alloy particulate is generally ready for conventional use in its intended application. In battery applications, anodes and rechargeable lithium batteries may be prepared with numerous optional designs and in numerous manners that have been documented extensively and are well known to those in the art.

The following examples are illustrative of certain aspects of the invention but should not be construed as limiting the invention in any way. Those skilled in the art will readily appreciate that other variants are possible for the methods used and materials produced herein.

EXAMPLES

Exemplary silicon alloy particulate were prepared using a two-step ball milling method in accordance with the invention. Other alloy particulate was also prepared for comparison purposes. Various characteristics of these particulates were determined and presented below. In addition, electrodes and electrochemical cells were prepared using some of these silicon alloy particulates. The cell performance results obtained from the electrochemical cells are also presented below.

Material Characterization

X-ray diffraction (XRD) patterns were collected using a Rigaku Ultima W diffractometer equipped with a Cu Kα X-ray source, a diffracted beam graphite monochromator and a scintillation detector. Average grain size was determined from XRD patterns using the Scherrer grain size determination method.

Specific surface area was determined by the single-point Brunauer-Emmett-Teller (BET) method using a Micromeritics Flowsorb 112300 surface area analyzer.

Scanning electron microscope (SEM) images were obtained and surface morphology characterized using a Schottky Field Emission Scanning Electron Microscope (SEM, TESCAN MIRA 3 LMU).

Average particle size was determined as the average of the greatest dimension of at least 200 random particles as directly observed by SEM.

True sample density was measured with a helium pycnometer (AccuPyc II 1340, Micrometrics).

Measurement of oxygen and nitrogen content was performed with a TC436DR oxygen and nitrogen analyzer manufactured by the LECO Corporation.

Electrode Preparation

Sample electrodes for laboratory testing were prepared from slurries prepared by mixing prepared alloy particulate, carbon black (Super C, Timcal), and a 10 wt % aqueous solution of lithium polyacrylate (LiPAA). The LiPAA solution was made by neutralizing a polyacrylic acid solution (Sigma-Aldrich, average molecular weight ~250,000 g/mole, 35 wt % in $H_2O$) with $LiOH·H_2O$ (Sigma Aldrich, 98%) in distilled water. The slurries had an alloy/carbon black/LiPAA volume ratio of 70/5/25 in distilled water. The mixing was conducted with a high shear mixer (Mazerustar) for 10 minutes. The resulting slurries were spread onto Cu foil (Furukawa Electric, Japan) with a 0.004-inch gap coating bar and dried in air at 120° C. for 1 hour. Typical active material loadings were about 2.0 mAh/cm².

Cell Preparation

To evaluate the various materials as electrode materials in Li-ion cells, laboratory test lithium half-cells were constructed and tested. Disk electrodes with a diameter of 13 mm were cut using a punch die and were further dried under vacuum at 120° C. for 2 h before cell assembly. The electrodes were assembled into 2325-type coin lithium half-cells with a lithium foil (99.9%, Sigma Aldrich) counter/reference electrode in an Ar-filled glovebox. (Note: as is well known to those skilled in the art, results from these test lithium half-cells allow for reliable prediction of electrode materials performance in lithium ion batteries.) Two layers of Celgard 2300 separator were used in each coin cell. A solution of 1 M $LiPF_6$ (BASF, 98%) in ethylene carbonate (EC)/diethyl carbonate (DEC)/monofluoroethylene carbonate (FEC) (all from BASF) with a volume ratio of 3/6/1 was used as electrolyte. Cells were cycled galvanostatically at 30.0±0.1° C. between 0.005 V and 0.9 V using a battery testing system (Neware). To determine C-rate, trial cells were cycled at a C/10 rate based on the alloy theoretical capacity (assuming that all the Si in the alloy was active with a capacity of 3578 mAh/g). From these trial cells, the actual material capacity was determined. The C-rates of cells used for cycling experiments were calculated from this measured capacity. During the first cycle, a C/10 rate was applied for discharging and charging, and a pseudo trickle (10 min open circuit-C/20 discharge to 0.005V-10 min open circuit-C/30 discharge to 0.005V) was used when the cutoff voltage (0.005 V) had been reached. In the following cycles, all currents used were two times larger than those in the first cycle.

Comparative Example CE1 and Inventive Examples IE2 Through IE7

Several Si—Ti—N alloy particulates were prepared using a high energy ball mill (Spex Mixer Mill Model 8000D, Spex CertiPrep, Metuchen, NJ) equipped with a 65 ml, hardened steel milling vial and with 180 g stainless steel balls (d=0.125 inch) as milling media. The ball mill was modified by enclosing the entire mill in a sealed outer chamber equipped with a gas inlet and outlet. The gas outlet was connected to an oil bubbler. The gas inlet was connected to a compressed nitrogen cylinder via a gas regulator and flowmeter.

Alloy particles were prepared using a 2-step ball milling process of the invention. In the common first milling step, in an Ar-filled glove box, 0.84561 g of Si powder (Sigma-Aldrich, 325 mesh, 99% metals basis and about 8 atomic % oxygen present as an impurity) and 0.25433 g of Ti powder (Alfa Aesar, 325 mesh, 99% metals basis) were loaded into the milling vial and the vial was closed with the o-ring seal removed. This allowed gas to flow in and out of the vial during the milling process, but maintained a sufficient seal such that the powder was retained in the vial. The milling vial was then placed in the ball mill clamp, the outer chamber was sealed and $N_2$ (g) was purged through the chamber in order that the air inside was displaced. The mill was then operated for 16 h under flowing $N_2$ (g) with a constant pressure of about 1 bar. The composition of the first milled particles was $Si_{68}Ti_{12}N_{15}O_5$. FIG. 1 shows the XRD pattern of the first milled particles. The pattern consists of broad peaks characteristic of an amorphous Si phase and a nanocrystalline TiN phase having an average grain size of 5 nm. The density and specific surface area of the first milled particles were measured to be 2.76 g/ml and 17.0 m²/g, respectively, corresponding to a volumetric surface area of 46.9 m²/cm³.

Figure 2:
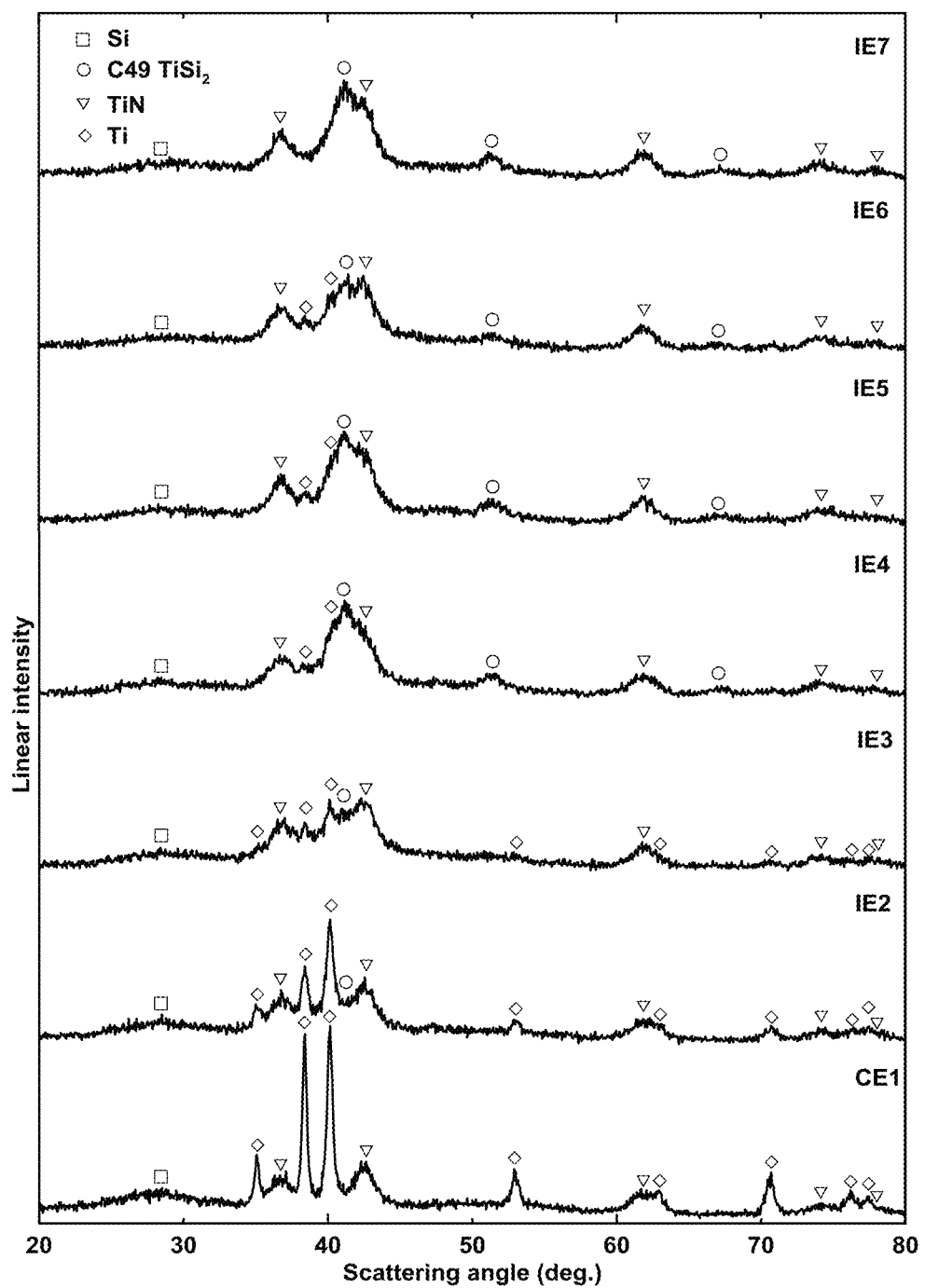
FIG. 2 shows the XRD patterns of inventive samples prepared in the Examples.
Figure 3:
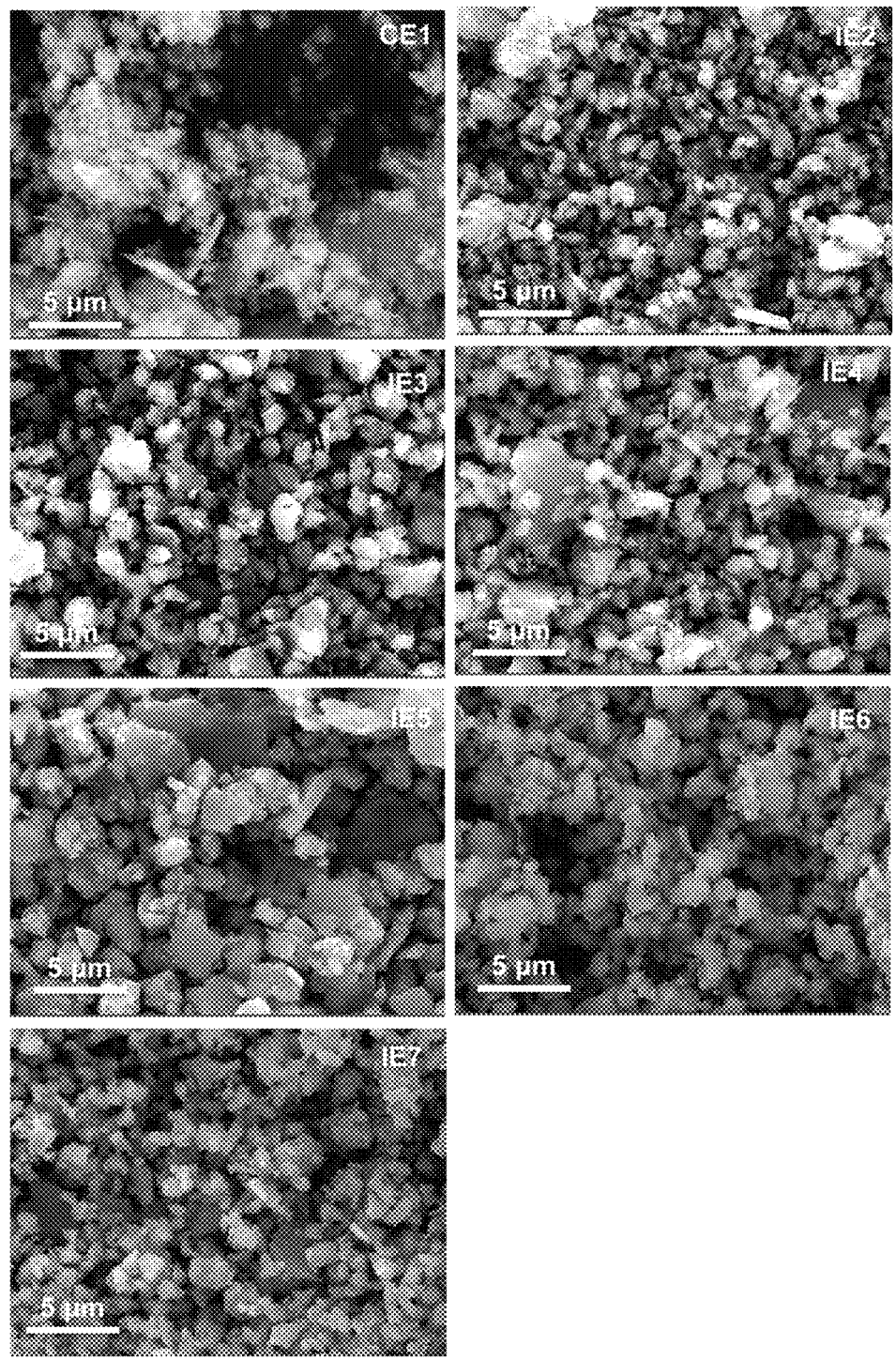
FIG. 3 shows representative SEM images of inventive samples prepared in the Examples.
Figure 4:
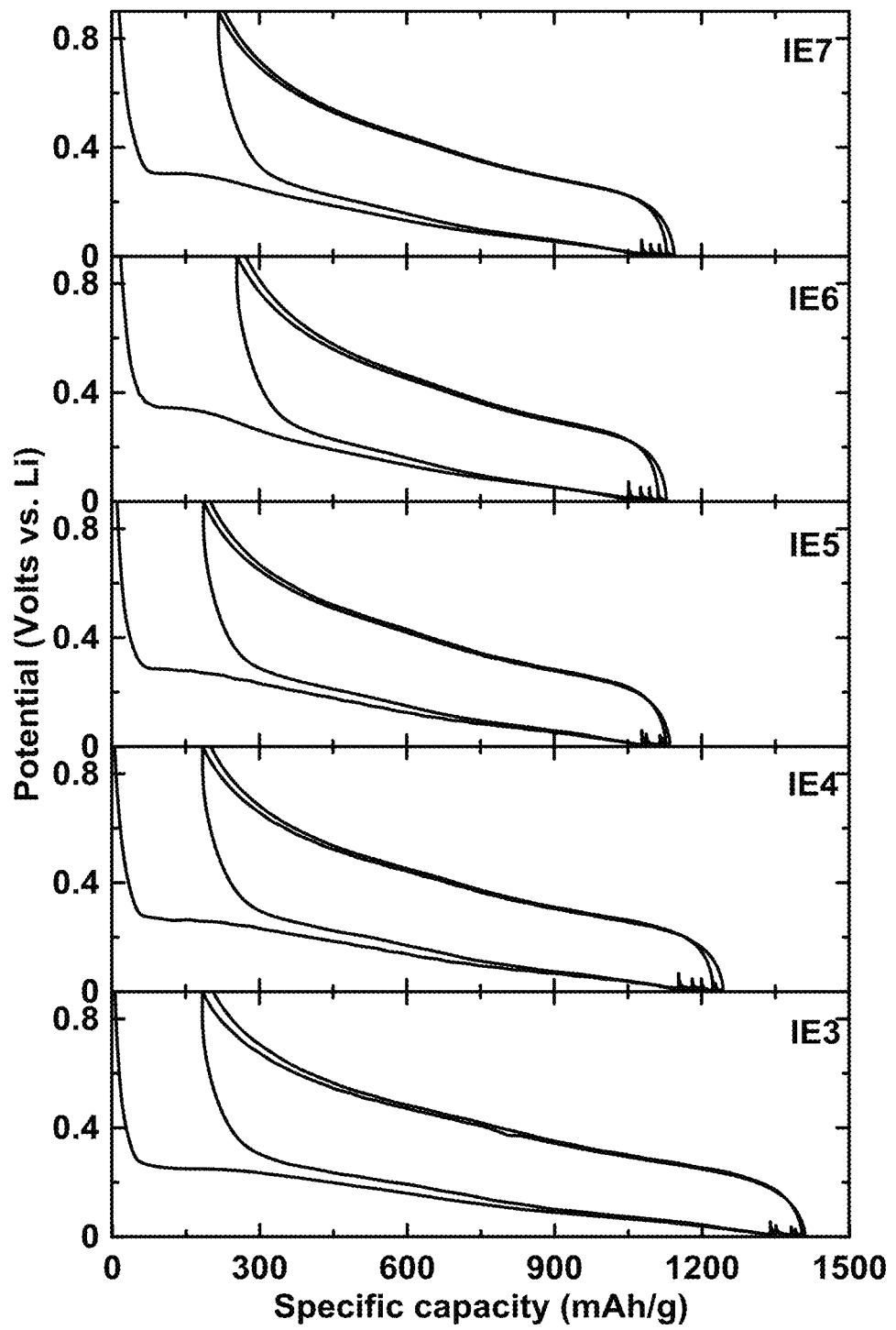
FIG. 4 shows potential profiles obtained from laboratory half-cells made from inventive samples prepared in the Examples.
Figure 5:
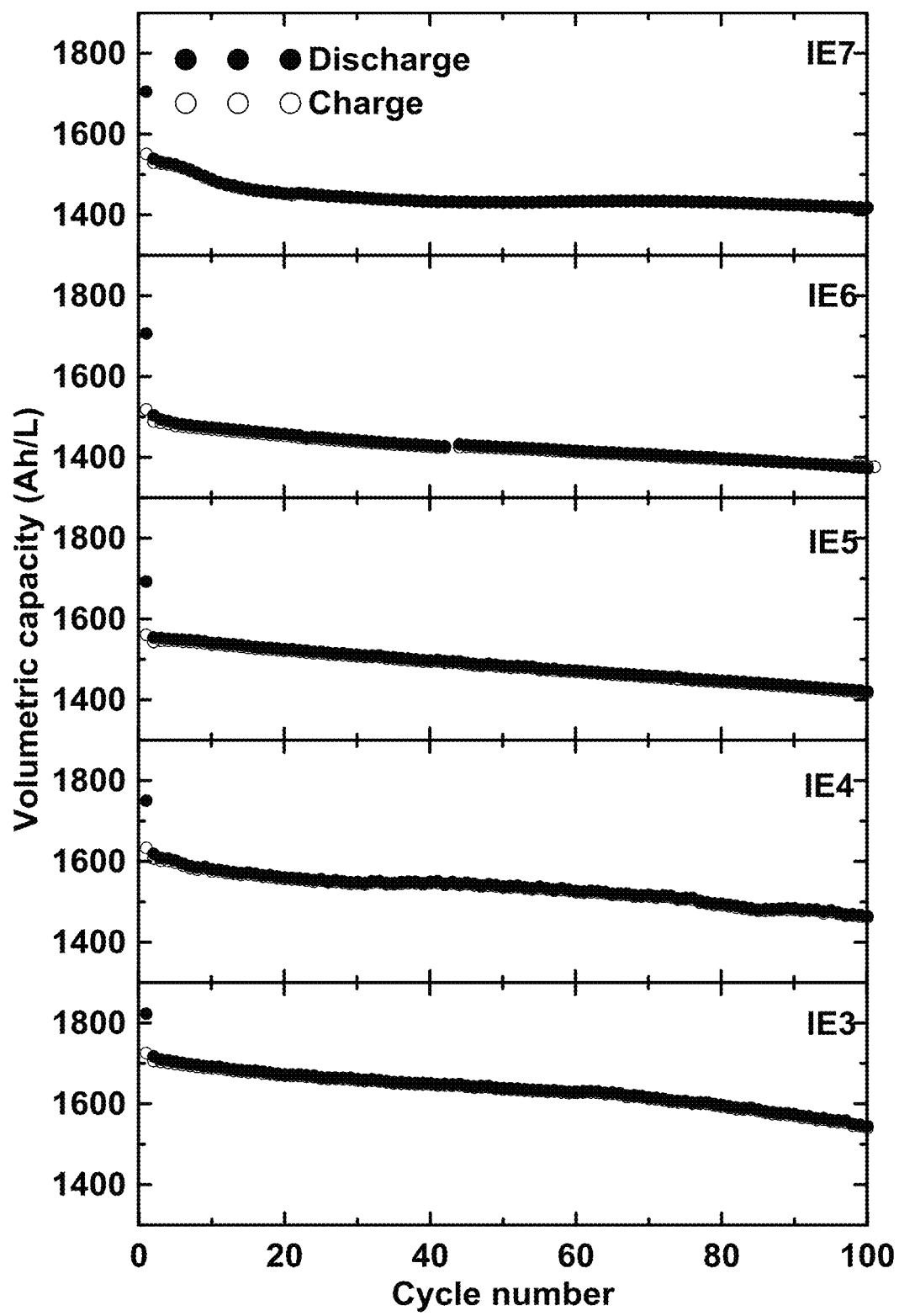
FIG. 5 shows cell capacity versus cycle number obtained from laboratory half-cells made from inventive samples prepared in the Examples.

The first milled particles then underwent a second ball milling step and seven different samples were taken after varied amounts of time. In this second milling step, the mill was then returned to the Ar-filled glove box and an additional amount of 0.36334 g of Ti powder was added, resulting in a 70/30 final Si/Ti molar ratio. The mill was made gas-tight by reinstalling the o-ring and the mill was sealed in the Ar glove box. The contents were then milled under argon for various amounts of time, as listed in Table 1 below. Nitrogen and oxygen contents of the samples were determined by the LECO method. The final composition of all samples, denoted as CE1 and IE2 through IE7 here, corresponded to the chemical formula $Si_{58}Ti_{25}N_{13}O_4$. The 2nd step milling time, densities, specific surface area, volumetric surface areas, and percent reductions in volumetric surface area from the first milled particles are listed in Table 1 below. XRD patterns and SEM images obtained from these samples are shown in FIGS. 2 and 3 respectively. The potential profiles (i.e. potential versus lithium plotted against specific capacity over several representative cycles) and the cell capacity vs. cycle number obtained from laboratory half-cells made from samples IE3 to IE7 are shown in FIGS.

4 and 5 respectively. Finally, the initial coulombic efficiency (ICE), reversible capacity, and 100-cycle capacity retention from laboratory half-cells made from samples IE3 to IE7 are shown in Table 2 below.

The XRD patterns of FIG. 2 show that when the second milling step is performed for insufficient time (i.e. 10 min. for CE1), the sample consists of an amorphous Si—Ti—O—N phase and a Ti metal phase. The integrated intensity of the largest XRD peak of the Ti metal phase of CE1 is 10.5% of the total integrated intensity of the XRD pattern as measured using Cu Kα radiation between 10° and 80° 2θ. The values in Table 1 show that the alloy particle surface area of some of these samples, while still reduced substantially from that following the first milling step, remains relatively high (>35 m$^2$/cm$^3$). For sample IE2 in which the second step milling time was 30 minutes, the integrated intensity of the largest XRD peak of the Ti metal phase was 7.1% of the total integrated intensity of the XRD pattern as measured using Cu Kα radiation between 10° and 80° 2θ. For samples in which the second step milling time was 90 minutes or greater no Ti peaks were present in the XRD pattern and the samples were fully amorphous. In addition, the volumetric surface areas of these samples were greatly reduced (<35 m$^2$/cm$^3$ and more than 20% smaller than the first milled particles). According to Table 1, the volumetric surface area of IE2 was reduced by an amount greater than 20% from the volumetric surface area of the first milled particles, the volumetric surface area of IE4 was reduced more than 30% from the volumetric surface area of the first milled particles, and the volumetric surface area of IE5 was reduced more than 45% from the volumetric surface area of the first milled particles.

According to the SEM images shown in FIG. 3, the particle size of the alloys CE1, IE2 to IE7 increased in size, from <0.1 μm (IE1) to ~5 μm flakes with an average thickness of 1 μm. As the second milling time increased further, the particle size reduced to ~1 μm particles (IE7). Almost no particles less than 0.2 μm in size are apparent in samples IE2 to IE7. Almost no particles less than 0.5 μm in size are apparent in samples IE3 to IE7 and almost no particles less than 1 μm in size are apparent in sample IE7.

According to Table 2, the second milling step resulted in an increased 100-cycle capacity retention which was continually improved as the second milling step time was increased. However, it should be noted that the alloy particulate surface area will increase if excessive second milling step time is used, which may result in capacity retention reduction if longer second milling step times are used than are shown here.

TABLE 1

| Sample | 2nd Step Milling Time (min.) | Density (g/cm$^3$) | Specific surface area (m$^2$/g) | Volumetric surface area (m$^2$/cm$^3$) | PSAR (%) |
|---|---|---|---|---|---|
| CE1 | 10 | 3.343 | 12.0 | 40.1 | 14.5 |
| IE2 | 30 | 3.326 | 10.5 | 34.9 | 25.6 |
| IE3 | 60 | 3.339 | 10.0 | 33.4 | 28.8 |
| IE4 | 90 | 3.417 | 8.8 | 30.1 | 35.8 |
| IE5 | 120 | 3.457 | 6.8 | 23.5 | 49.9 |
| IE6 | 150 | 3.547 | 8.3 | 29.4 | 37.3 |
| IE7 | 180 | 3.492 | 9.5 | 33.2 | 29.2 |

TABLE 2

| Sample | ICE (%) | Reversible capacity (mAh/g) | Reversible capacity (Ah/L) | Elemental Si Phase (vol. %) | 100-cycle Capacity retention (%) |
|---|---|---|---|---|---|
| IE3 | 87.3 | 1228.7 | 1725.5 | 49.2 | 77.8 |
| IE4 | 85.2 | 1058.8 | 1633.5 | 43.4 | 79.3 |
| IE5 | 83.7 | 948.7 | 1560.8 | 39.3 | 82.5 |
| IE6 | 77.3 | 873.4 | 1518.4 | 37.2 | 82.7 |
| IE7 | 81.1 | 927.0 | 1551.1 | 38.8 | 83.5 |

Comparative Example CE8

Figure 6:
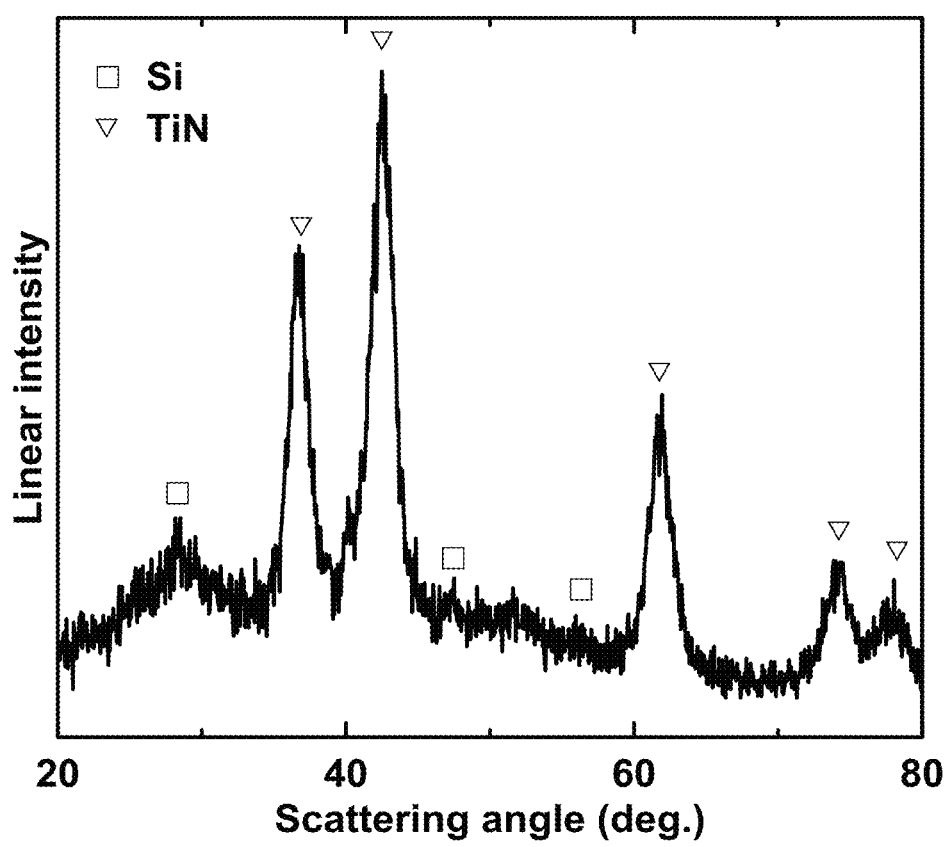
FIG. 6 shows the XRD pattern of a comparative sample prepared in the Examples.
Figure 7:
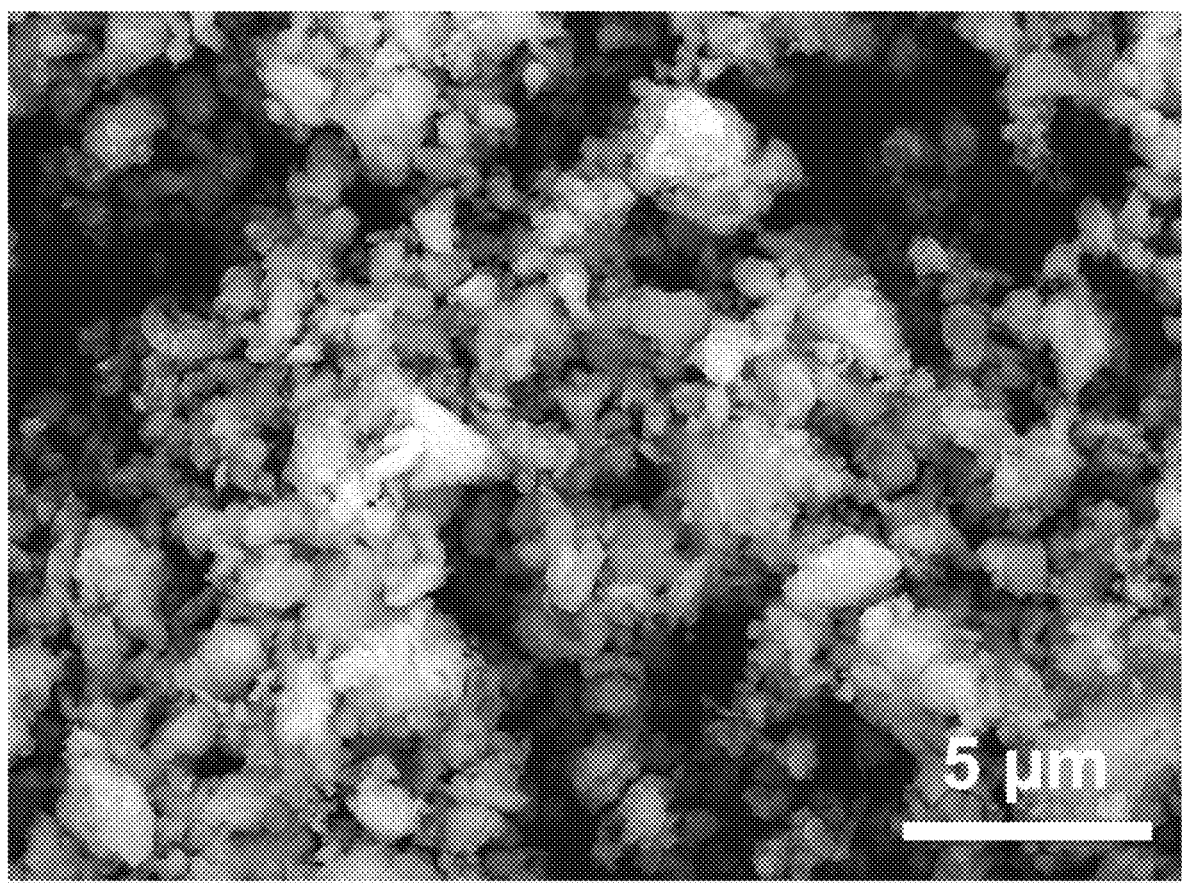
FIG. 7 shows a representative SEM image of a comparative sample prepared in the Examples.
Figure 8:
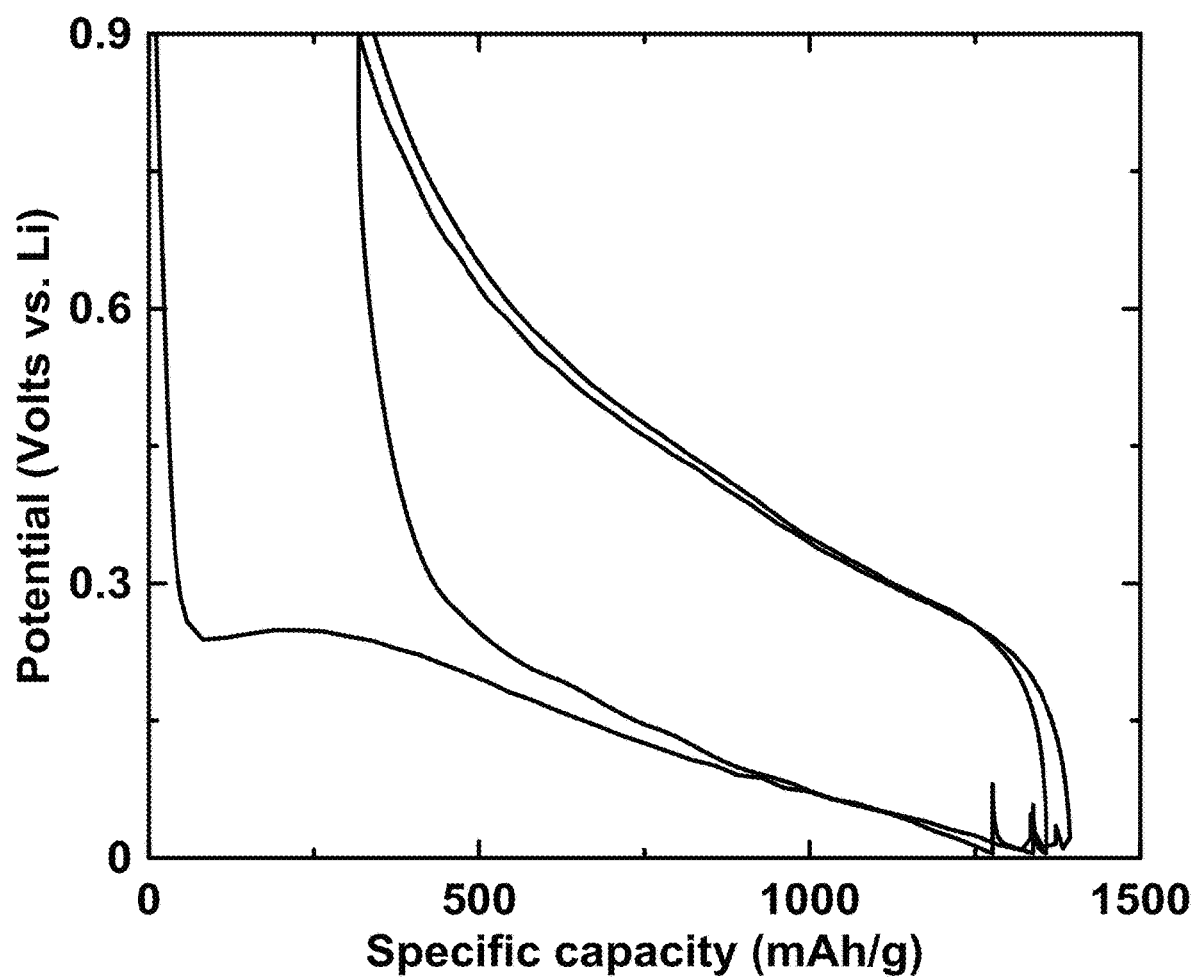
FIG. 8 shows potential profiles obtained from a laboratory half-cell made from a comparative sample prepared in the Examples.
Figure 9:
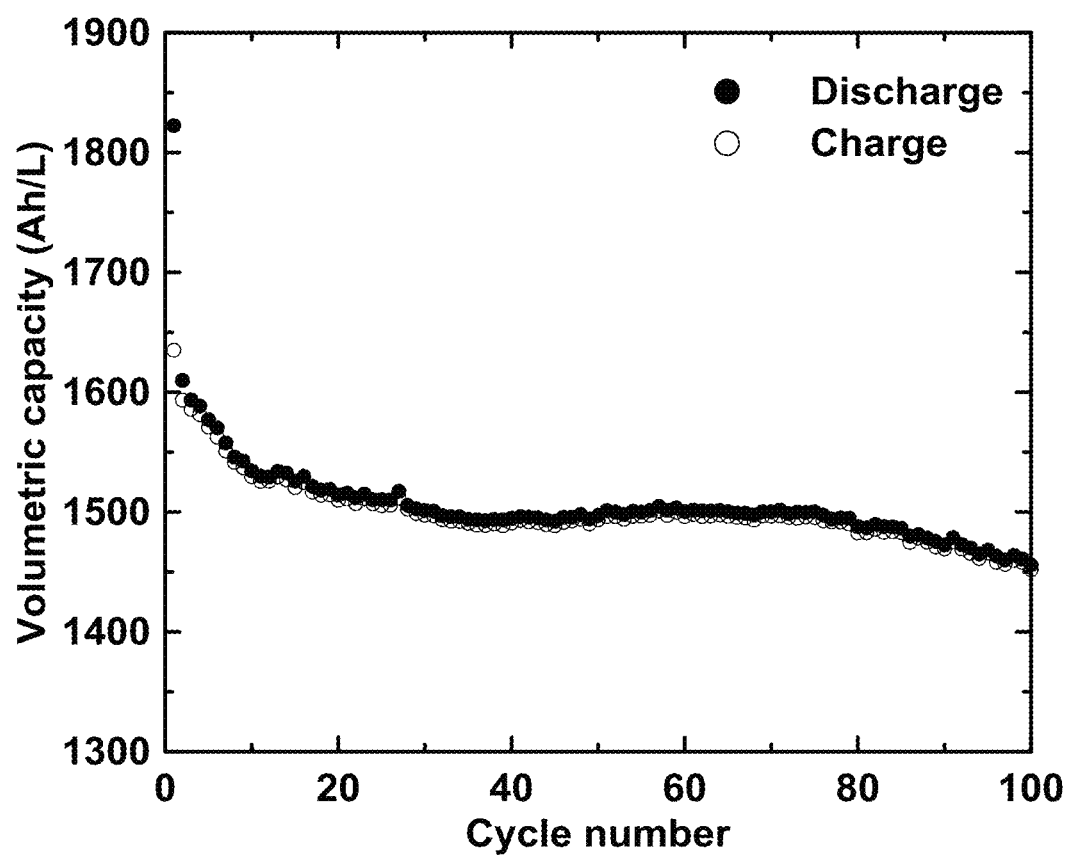
FIG. 9 shows cell capacity versus cycle number obtained from a laboratory half-cell made from a comparative sample prepared in the Examples.

A comparative Si—Ti—N alloy particulate was prepared using a high energy ball mill in a like manner to the preceding Inventive samples. Here however, only a single ball milling step was performed. Here, 0.84561 g of similar Si powder and 0.61767 g of similar Ti powder, resulting in a 70/30 Si/Ti molar ratio, were loaded into the milling vial and the aforementioned milling procedure was followed. Again, the mill was operated for 16 h under flowing N$_2$ (g) with a constant pressure of about 1 bar. As before, nitrogen and oxygen contents of the sample were determined by the LECO method. The final sample composition, specific and volumetric surface areas and density of the sample are listed in Table 3 below. The XRD pattern and a SEM image obtained from this sample is shown in FIGS. 6 and 7 respectively. The potential profiles and the cell capacity vs. cycle number obtained from a laboratory half-cell made from this sample are shown in FIGS. 8 and 9 respectively. And, the initial coulombic efficiency (ICE), reversible capacity, and 100-cycle capacity retention from laboratory half-cells made from each of these samples are shown in Table 4 below.

Comparative example CE8 made by this conventional single ball milling step method has a large volumetric surface area (>35 m$^2$/cm$^3$) and a low capacity retention of 78.1%. The XRD pattern of this sample shows that it is not completely amorphous, but instead comprises nanocrystalline TiN as a major phase. According to the SEM image of this sample, it consists of loose particles ranging from 0.1-1 μm in size, with an average size of 0.5 μm.

TABLE 3

| Example | Sample Composition | Specific surface area (m$^2$/g) | Volumetric surface area (m$^2$/cm$^3$) | Density (g/cm$^3$) |
|---|---|---|---|---|
| CE8 | Si$_{51}$Ti$_{22}$N$_{21}$O$_6$ | 11.0 | 37.1 | 3.37 |

TABLE 4

| Example | ICE (%) | Reversible capacity (mAh/g) | Reversible capacity (Ah/L) | Elemental Si Phase (vol. %) | 100-cycle Capacity retention (%) |
|---|---|---|---|---|---|
| CE8 | 77.2 | 1076.2 | 1635.0 | 43.5 | 78.1 |

Comparative Example CE9

A comparative Si—Ti—N alloy particulate was prepared using a high energy ball mill in a like manner to the preceding inventive samples except that only a single ball milling step was performed. Here, 0.84561 g of Si powder and 0.25433 g of similar Ti powder, resulting in an 85/15 Si/Ti molar ratio, were loaded into the milling vial and the aforementioned milling procedure was followed. It was found that a minimum in volumetric surface area of 38.1 m$^2$/cm$^3$ was achieved after 75 min. of milling. However, the XRD pattern of this sample contains peaks indicating the presence of nanocrystalline Si with an average grain size of 10 nm. This demonstrates that the utilization of a 2-step milling method of examples IE2-IE7 results in a lower volumetric surface area and a smaller grain size of the elemental Si phase than a 1-step milling method.

Inventive Example IE10

Figure 10:
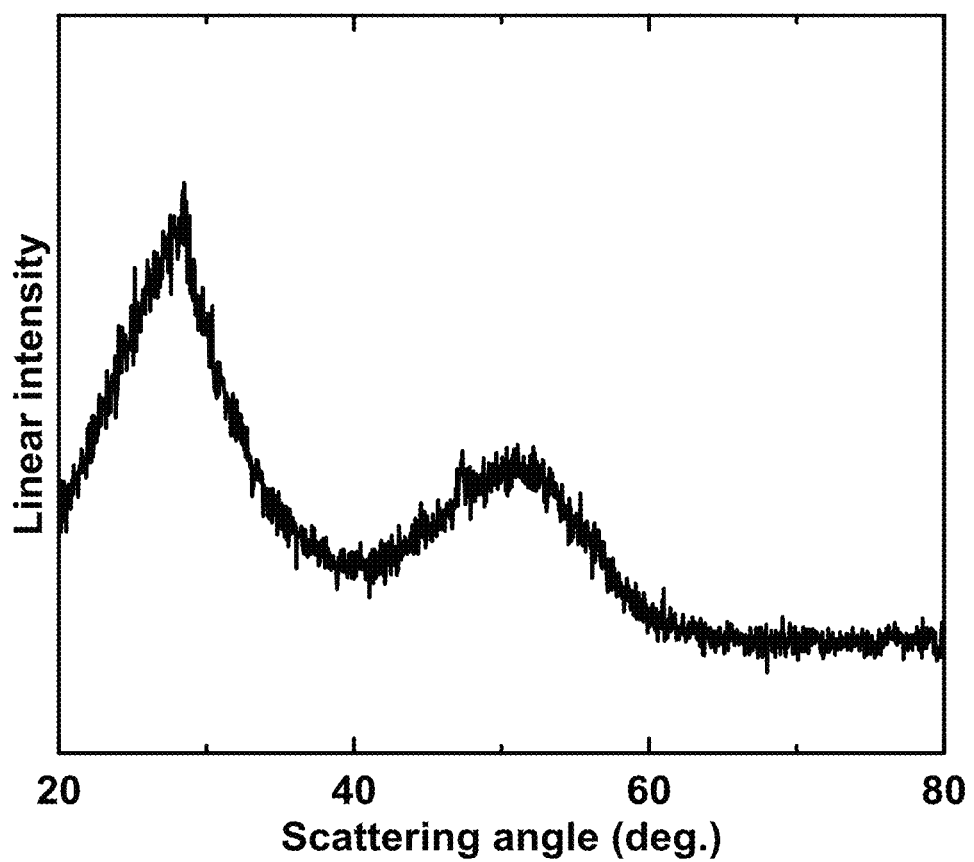
FIG. 10 shows the XRD pattern of the first milled particles of an inventive sample prepared in the Examples.
Figure 11:
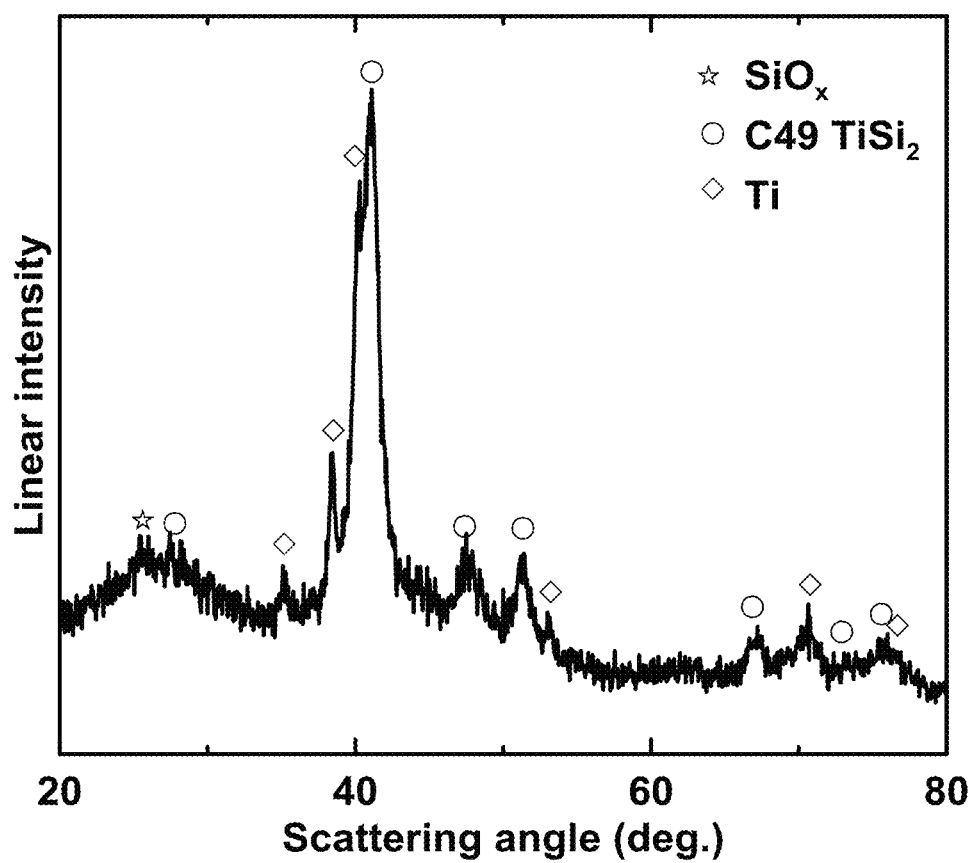
FIG. 11 shows the XRD pattern of an inventive sample prepared in the Examples.

A Si—Ti—O alloy particulate was prepared using a high energy ball mill (Spex Mixer Mill Model 8000D, Spex CertiPrep, Metuchen, NJ) equipped with a 65 ml, hardened steel milling vial and with 180 g stainless steel balls (d=0.125 inch) as milling media. The alloy particulate was prepared using a 2-step ball milling process of the invention. In the first milling step, 0.97712 g of Si powder (Sigma-Aldrich, 325 mesh, 99% metals basis and about 8 atomic % oxygen present as an impurity) was loaded into the milling vial and the vial was closed with the o-ring seal removed. This allowed gas to flow in and out of the vial during the milling process, but maintained a sufficient seal such that the powder was retained in the vial. The milling vial was then placed in the ball mill clamp. The mill was then operated for 16 h in ambient room air. FIG. 10 shows the XRD pattern of the first milled particles. The pattern indicates that the sample is completely amorphous and is characteristic of amorphous silicon suboxide, which consists of amorphous Si and amorphous Si—O phases. Nitrogen and oxygen contents of the first milled sample was determined by the LECO method and corresponded to a composition of the first milled sample of Si$_{73.0}$O$_{27.0}$. This sample had a density of 2.36 g/ml and a specific surface area of 26.8 m$^2$/g, corresponding to a volumetric surface area of 63.2 m$^2$/cm$^3$. Under an Ar atmosphere, 0.36334 g of Ti were then added to the hardened steel milling vial containing the first milled sample and 180 g stainless steel balls (d=0.125 inch) as milling media. The cover of the vial was equipped with an o-ring seal and the contents were sealed under an Ar atmosphere and then ball milled for 180 min. The composition of the resulting second milling step sample was Si$_{63.0}$O$_{23.3}$Ti$_{13.7}$. The XRD pattern of the resulting second milling step sample is shown in FIG. 11. It consists of a broad peak near 28° that is characteristic of amorphous Si and amorphous Si—O phases, nanocrystalline TiSi$_2$ with a grain size of about 7 nm, and Ti having an average grain size of about 22 nm and a largest XRD diffraction peak whose area is 3% of that of the largest diffraction peak in the XRD pattern (that corresponding to the TiSi$_2$ phase near 43°). This sample had a density of 2.80 g/ml and a specific surface area of 14.8 m$^2$/g, corresponding to a volumetric surface area of 41.5 m$^2$/cm$^3$. This volumetric surface area corresponds to a 34% reduction in volumetric surface area compared to the first step sample.

Inventive Example IE1

Figure 12:
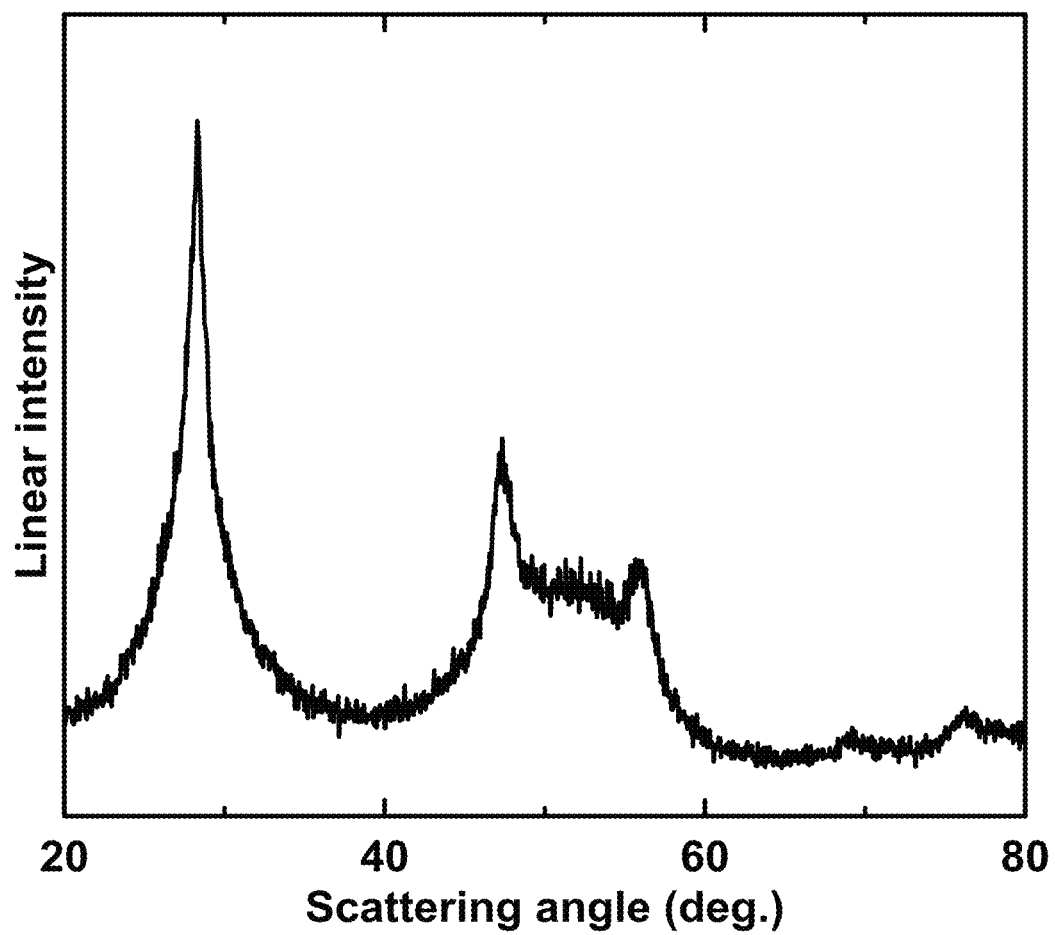
FIGS. 12 and 13 show the XRD patterns of first milled particles and second milled particles respectively of an inventive sample prepared in the Examples.
Figure 13:
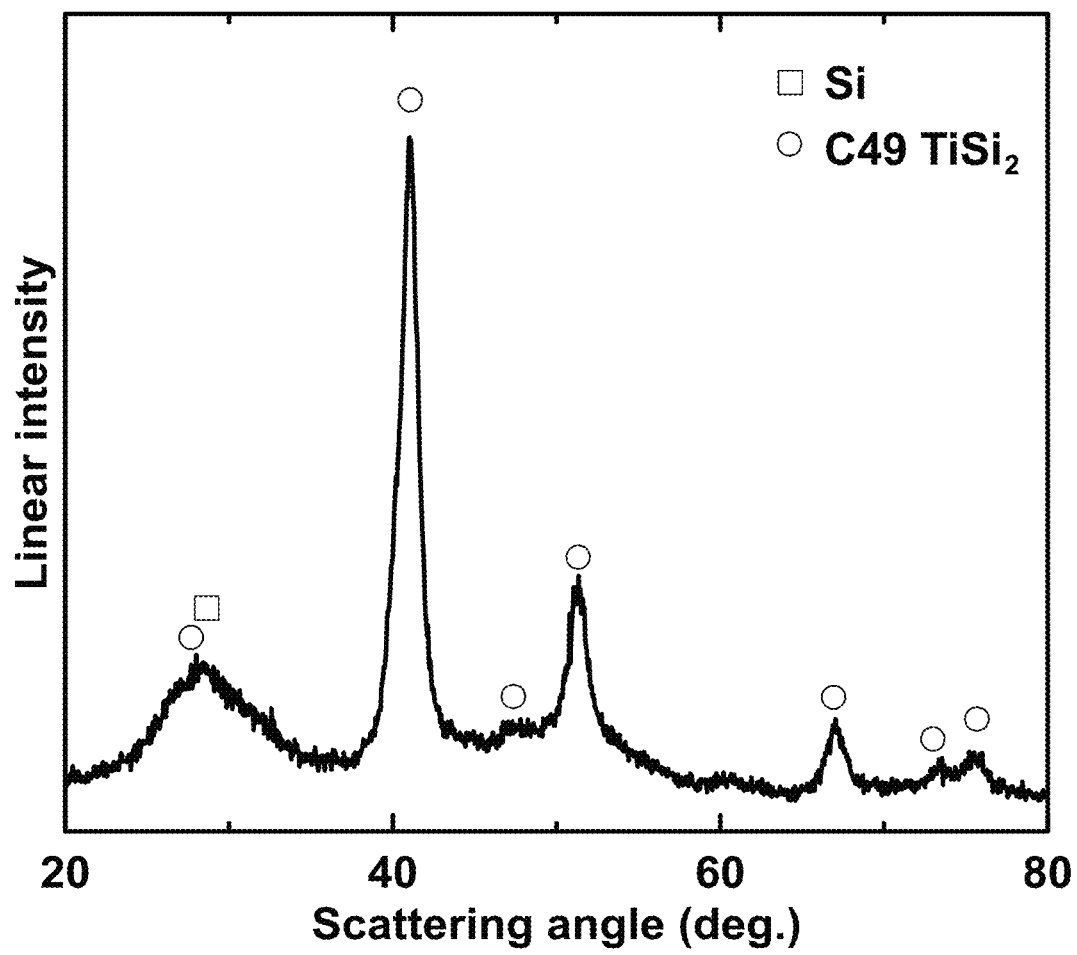

A Si—Ti alloy particulate was prepared using a high energy ball mill (Spex Mixer Mill Model 8000D, Spex CertiPrep, Metuchen, NJ) equipped with a 65 ml, hardened steel milling vial and with 180 g stainless steel balls (d=0.125 inch) as milling media. The alloy particulate was prepared using a 2-step ball milling process of the invention. In the first milling step, 1.007858 g of Si powder (Sigma-Aldrich, 325 mesh, 99% metals basis and about 8 atomic % oxygen present as an impurity) was loaded into the milling vial and was flushed with Ar. The cover of the vial was equipped with an o-ring seal and the contents were sealed under Ar in an Ar-filled glovebox. The milling vial was then placed in the ball mill clamp and the mill was then operated for 4 h. FIG. 12 shows the XRD pattern of the first milled particles. The pattern is characteristic of a mixture of nanocrystalline silicon (having a grain size of 5 nm, according to applying the Scherrer equation to the largest x-ray diffraction peak) and amorphous silicon. This sample had a density of 2.24 g/ml and a specific surface area of 29.47 m$^2$/g, corresponding to a volumetric surface area of 66.02 m$^2$/cm$^3$. Under an Ar atmosphere, 0.303128 g of Ti particulate (Alfa Aesar, 325 mesh, 99% metals basis) was then added to the hardened steel milling vial containing the first milled sample and 180 g stainless steel balls (d=0.125 inch) as milling media. The cover of the vial was equipped with an o-ring seal and the contents were sealed under an Ar atmosphere and then ball milled for 300 min. The composition of the resulting second milling step sample was Si$_{85}$Ti$_{15}$. The XRD pattern of the resulting second milling step sample is shown in FIG. 13. It consists of a broad peak near 28° that is characteristic of amorphous Si, and additional peaks that are characteristic of nanocrystalline TiSi$_2$ with a grain size of about 7 nm, according to applying the Scherrer equation to the largest x-ray diffraction peak. This sample had a density of 3.04 g/ml and a specific surface area of 11.16 m$^2$/g, corresponding to a volumetric surface area of 33.93 m$^2$/cm$^3$. This volumetric surface area corresponds to a 48.61% reduction in volumetric surface area compared to the first step sample.

Inventive Example IE12

Figure 14:
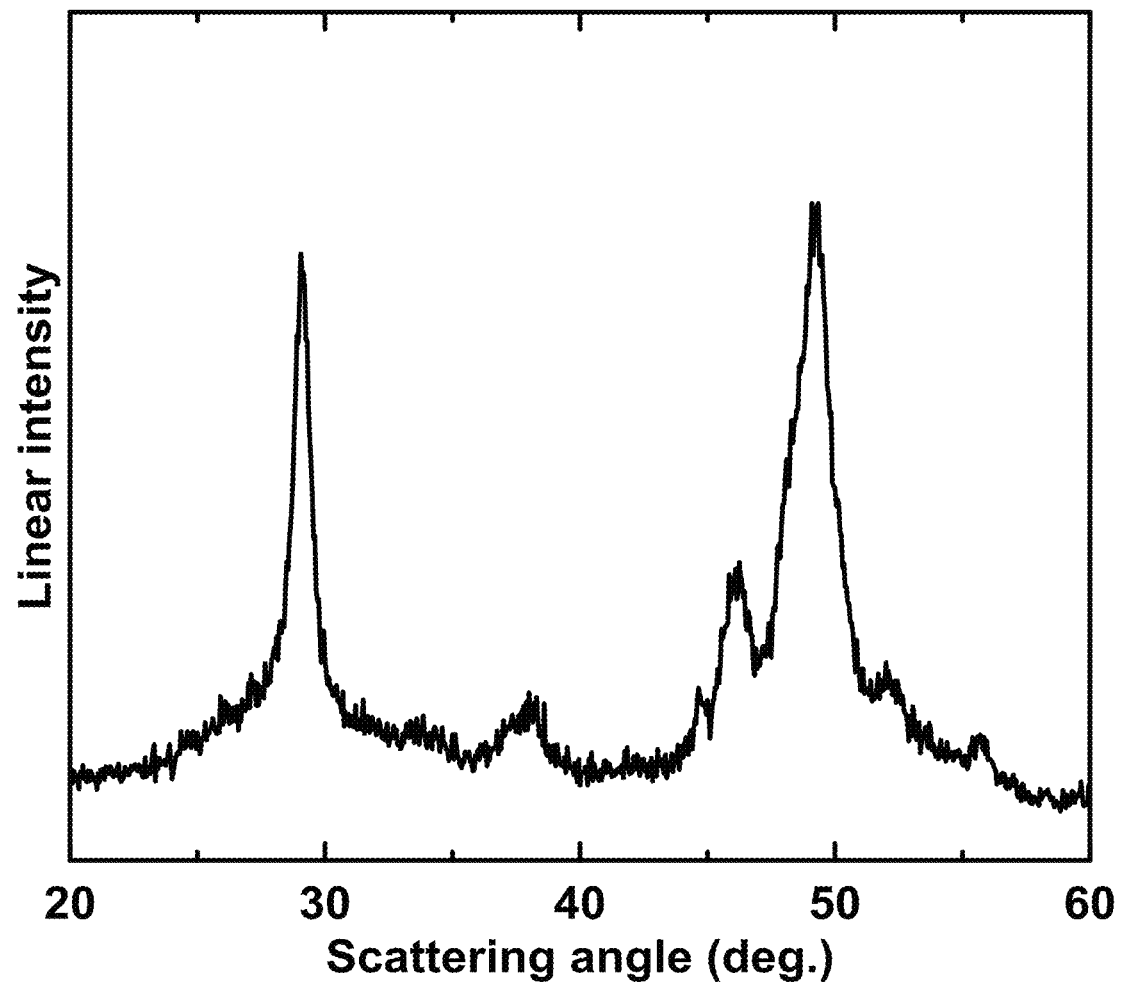
FIG. 14 shows the XRD pattern of the second milled particles of an inventive sample prepared in the Examples.

A Si—Fe alloy particulate was prepared in the same manner as IE11, excepting that 0.370193 g of Fe particulate (Alfa Aesar, 99.9% pure, <10 μm) was used in the second milling step. The composition of the resulting second milling step sample was Si$_{85}$Fe$_{15}$. The XRD pattern of the resulting second milling step sample is shown in FIG. 14. It consists of a broad peak near 28° that is characteristic of amorphous Si. An additional peak also near 28° corresponds to nanocrystalline FeSi$_2$ phase. All the other peaks in the XRD pattern also correspond to this nanocrystalline Fe Si$_2$ phase, which has a grain size of about 7 nm, according to applying the Scherrer equation to its x-ray diffraction peak near 28°. This sample had a density of 3.18 g/ml and a specific surface area of 12.88 m$^2$/g, corresponding to a volumetric surface area of 40.96 m$^2$/cm$^3$. This volumetric surface area corresponds to a 37.95% reduction in volumetric surface area compared to the first step sample.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

We claim:

1. A method of making low surface area silicon alloy particles, the method comprising:
   obtaining an amount of precursor particles comprising silicon;
   dry ball milling the precursor particles in a first milling step to produce an amount of first milled particles having a first volumetric surface area and are amorphous silicon oxide having the formula $SiO_x$ wherein $x<1$;
   adding an amount of binding metal particles selected from the group consisting of Ti, V, Cr, Mn, Fe, Co, Ni, Cu, W, Mo, Nb, Y, Zr, La, Ce, and mischmetal to the amount of first milled particles to form a mixture wherein the amount of binding metal particles in the mixture is at least 10 atomic %; and
   ball milling the mixture in a second milling step, thereby forming a second milled mixture, until:
      the amount of first milled particles and the amount of binding metal particles have alloyed sufficiently such that the x-ray diffraction pattern comprises no crystalline peaks;
      all the phases in the second milled mixture have an average grain size less than 50 nm; and
      the surface area of the second milled mixture has a second volumetric surface area that is 80% or less than the first volumetric surface area;
   thereby producing an amount of the low surface area silicon alloy particles with a second volumetric surface area less than 35 $m^2/cm^3$.

2. The method of claim 1 wherein the precursor particles are pure silicon particles, a mixture comprising silicon particles and carbon particles, a mixture comprising silicon particles and precursor transition metal particles, or a mixture comprising silicon particles and precursor rare earth metal particles.

3. The method of claim 2 wherein the precursor particles are a mixture of silicon and titanium particles.

4. The method of claim 2 wherein the precursor particles are pure silicon particles.

5. The method of claim 2 wherein the precursor particles are a mixture of silicon and precursor transition metal particles and the method comprises ball milling the precursor particles in the first milling step until the x-ray diffraction pattern of the first milled particles has no peaks associated with the precursor transition metal particles.

6. The method of claim 1 wherein the first milling step is performed in a non-inert gas.

7. The method of claim 6 wherein the first milling step is performed in nitrogen or air.

8. The method of claim 1 wherein the binding metal particles comprise Ti, V, Cr, Mn, Fe, Co, Ni, Cu, W, Mo, or Nb.

9. The method of claim 8 wherein the binding metal particles are titanium.

10. The method of claim 8 wherein the amount of binding metal particles in the mixture is at least 15 atomic %.

11. The method of claim 10 wherein the amount of binding metal particles in the mixture is at least 20 atomic %.

12. The method of claim 1 wherein the binding metal particles comprise Y, Zr, La, Ce, or mischmetal.

13. The method of claim of claim 1 comprising ball milling the precursor particles in the first milling until the elemental silicon present is amorphous.

14. The method of claim 1 comprising ball milling the mixture in the second milling step until the x-ray diffraction pattern of the low surface area silicon alloy particles has no peaks associated with the binding metal particles.

15. The method of claim 1 wherein the ball milling in the first and second milling steps comprises high energy ball milling or rotary ball milling.

16. The method of claim 1 wherein the surface area of the mixture has a second volumetric surface area that is 70% or less than the first volumetric surface area.

17. The method of claim 1 wherein the average particle size of the produced low surface area silicon alloy particles is greater than 0.5 μm.

18. The method of claim 1 wherein the produced low surface area silicon alloy particles comprise silicon, titanium, nitrogen, and oxygen.

19. The method of claim 1 wherein the obtaining an amount of precursor particles comprising silicon comprises ball milling the precursor particles in a first milling step until the elemental silicon present is amorphous.

20. The method of claim 1 wherein the obtaining an amount of precursor particles comprising silicon comprises ball milling the precursor particles in a first milling step until the precursor particles are amorphous.

21. A method of making a rechargeable lithium battery comprising:
   making low surface area silicon alloy particles according to the method of claim 1;
   preparing an electrode using the low surface area silicon alloy particles; and
   incorporating the electrode as the anode in the manufacture of the rechargeable lithium battery.

22. A method of making low surface area silicon alloy particles, the particles comprising an elemental silicon phase in an amount that is at least 10% by volume and at least one transition metal or rare earth metal, and having an oxygen content in atomic percent that is less than the silicon content, the method comprising:
   obtaining an amount of precursor particles comprising silicon;
   ball milling the precursor particles in air in a first milling step until the elemental silicon phase present has an average grain size less than 20 nm, thereby producing an amount of first milled particles having a first volumetric surface area and are amorphous $SiO_x$ wherein $x<1$;
   adding an amount of binding metal particles selected from the group consisting of Ti, V, Cr, Mn, Fe, Co, Ni, Cu, W, Mo, Nb, Y, Zr, La, Ce, and mischmetal to the amount of first milled particles to form a mixture wherein the amount of binding metal particles in the mixture is at least 10 atomic %; and
   ball milling the mixture in a second milling step, thereby forming a second milled mixture, until:
      the amount of first milled particles and the amount of binding metal particles have alloyed sufficiently such that the x-ray diffraction pattern of the second milled mixture has a largest peak associated with the binding metal particles with an integrated intensity that is less than 10% of the total integrated intensity of the x-ray diffraction pattern measured between 10°-80° 2θ with Cu Kα radiation;
      all the phases in the second milled mixture have an average grain size less than 50 nm; and
      the surface area of the second milled mixture has a second volumetric surface area that is 80% or less than the first volumetric surface area;

thereby producing an amount of the low surface area silicon alloy particles with a second volumetric surface area less than 35 m²/cm³.

23. A method of making low surface area silicon alloy particles the method comprising:
    obtaining an amount of precursor particles, wherein the precursor particles are pure silicon particles;
    dry ball milling the precursor particles in a first milling step until the elemental silicon phase present has an average grain size less than 20 nm, thereby producing an amount of first milled particles having a first volumetric surface area;
    adding an amount of binding metal particles selected from the group consisting of Ti, V, Cr, Mn, Fe, Co, Ni, Cu, W, Mo, Nb, Y, Zr, La, Ce, and mischmetal to the amount of first milled particles to form a mixture wherein the amount of binding metal particles in the mixture is at least 10 atomic %; and
    ball milling the mixture in a second milling step, thereby forming a second milled mixture, until:
        the surface area of the second milled mixture has a second volumetric surface area less than 35 m²/cm³;
        the surface area of the second milled mixture has a second volumetric surface area that is 80% or less than the first volumetric surface area;
    thereby producing an amount of the low surface area silicon alloy particles with a second volumetric surface area less than 35 m²/cm³.

24. A method of making low surface area silicon alloy particles comprising:
    obtaining an amount of precursor particles comprising silicon;
    dry ball milling the precursor particles in a first milling step until the elemental silicon phase present has an average grain size less than 20 nm, thereby producing an amount of first milled particles having a first volumetric surface area;
    adding an amount of binding metal particles comprising titanium to the amount of first milled particles to form a mixture wherein the amount of binding metal particles in the mixture is at least 10 atomic %; and
    ball milling the mixture in a second milling step, thereby forming a second milled mixture, until:
        the phases in the second milled mixture have an average grain size less than 50 nm; and
        the surface area of the second milled mixture has a second volumetric surface area less than 35 m²/cm³;
        the surface area of the second milled mixture has a second volumetric surface area that is 80% or less than the first volumetric surface area;
    thereby producing an amount of the low surface area silicon alloy particles with a second volumetric surface area less than 35 m²/cm³.

* * * * *